(12) United States Patent
Hughes et al.

(10) Patent No.: US 7,571,344 B2
(45) Date of Patent: Aug. 4, 2009

(54) ENSURING DATA INTEGRITY IN NETWORK MEMORY

(75) Inventors: David Anthony Hughes, Los Altos Hills, CA (US); John Burns, Los Altos, CA (US); Zhigang Yin, Mountain View, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 527 days.

(21) Appl. No.: 11/357,657

(22) Filed: Feb. 16, 2006

(65) Prior Publication Data

US 2007/0038816 A1 Feb. 15, 2007

Related U.S. Application Data

(63) Continuation-in-part of application No. 11/202,697, filed on Aug. 12, 2005.

(51) Int. Cl.
*G06F 11/00* (2006.01)
(52) U.S. Cl. .................. 714/4; 714/5; 714/6; 714/42
(58) Field of Classification Search ............... 714/4, 714/5, 6, 12, 20, 21, 42; 711/147, 154; 709/213, 709/214; 707/8, 201
See application file for complete search history.

(56) References Cited

U.S. PATENT DOCUMENTS

| 6,295,541 | B1 * | 9/2001 | Bodnar et al. ............ 714/12 |
| 7,007,044 | B1 * | 2/2006 | Rafert et al. .............. 714/6 |
| 7,113,962 | B1 * | 9/2006 | Kee et al. ................ 709/223 |
| 7,120,666 | B2 | 10/2006 | McCanne et al. |
| 7,266,645 | B2 * | 9/2007 | Garg et al. ................ 714/6 |
| 2003/0233431 | A1 * | 12/2003 | Reddy et al. ............ 709/221 |
| 2004/0117571 | A1 | 6/2004 | Chang et al. |
| 2004/0243571 | A1 | 12/2004 | Judd |
| 2006/0143497 | A1 * | 6/2006 | Zohar et al. ............ 714/4 |

OTHER PUBLICATIONS

Muthitacharoen, Athicha et al., "A Low-bandwidth Network File System," 2001, in Proc. of the 18th ACM Symposium on Operating Systems Principles, Banff, Canada, pp. 174-187.

* cited by examiner

*Primary Examiner*—Robert Beausoliel
*Assistant Examiner*—Joseph D Manoskey
(74) *Attorney, Agent, or Firm*—Carr & Ferrell LLP

(57) ABSTRACT

A first appliance for ensuring data integrity in network memory is disclosed. The first appliance includes a processor and a communications interface that communicates over a communication network with a second appliance of the network memory. The processor determines whether reconciliation between a first peer state information in the first appliance and a second peer state information in the second appliance is needed. The first peer state information and the second peer state information track the status of data in the network memory. The processor determines an action to reconcile the first peer state information with the second peer state information based on a positive determination that the reconciliation is needed. The processor then performs the action to reconcile the first peer state information with the second peer state information.

27 Claims, 23 Drawing Sheets

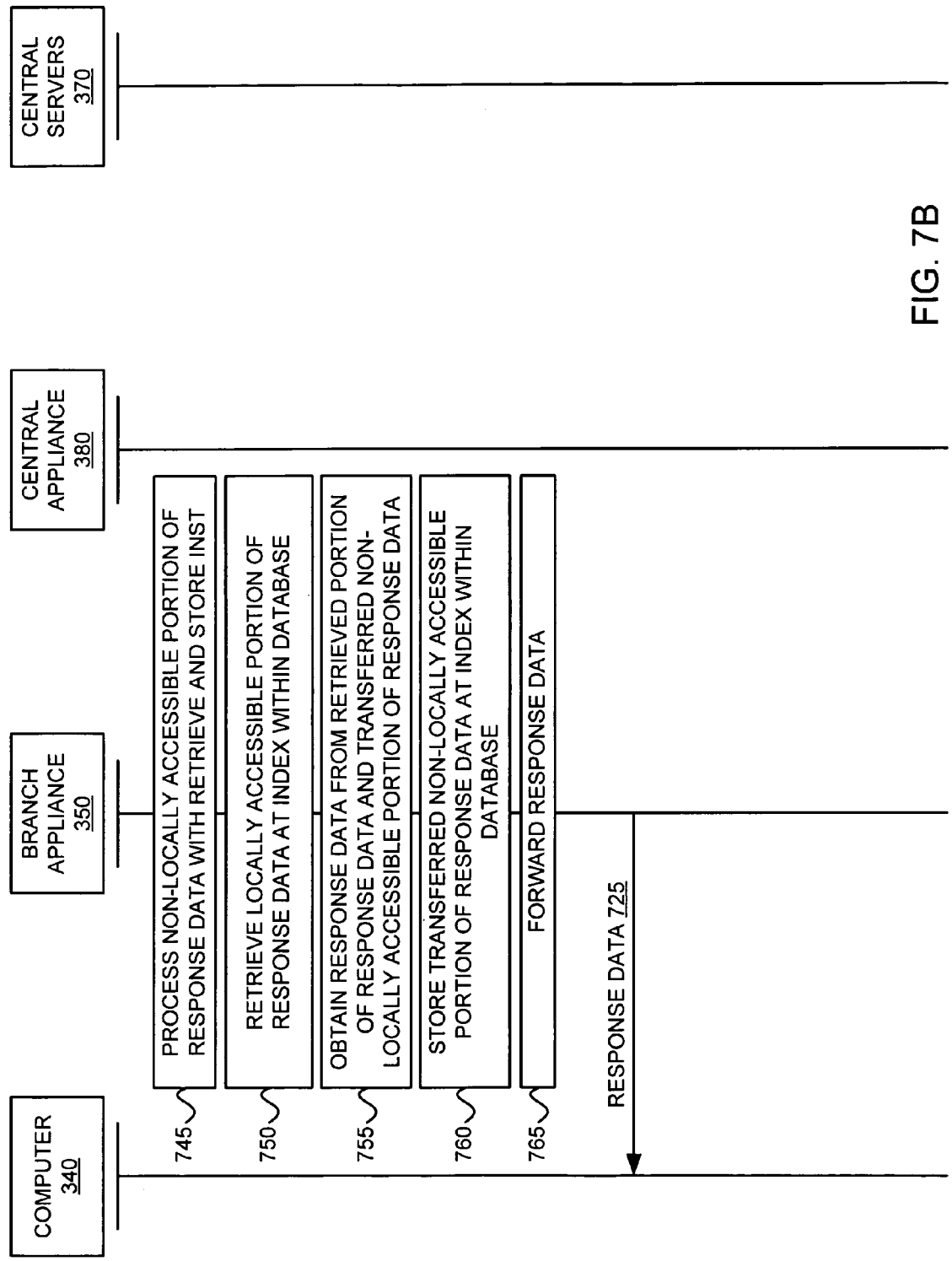

ENSURING DATA INTEGRITY IN NETWORK MEMORY

CROSS-REFERENCE TO RELATED APPLICATION

This application is a continuation-in-part of U.S. application Ser. No. 11/202,697, filed Aug. 12, 2005 and entitled "Network Memory Architecture."

BACKGROUND

1. Technical Field

The present invention relates generally to communication networks and more particularly to ensuring data integrity in network memory.

2. Description of Related Art

To allow remote employees access to an enterprise's information systems, organizations typically choose between two networking approaches: centralized servers or distributed servers. Centralized server implementations have the advantage of simplicity since an information technology (IT) professional centrally manages, maintains, and enforces policies for the organization's data.

FIG. 1 is an illustration of a centralized server system 100 in the prior art. The centralized server system 100 includes a branch office 110 and a central office 120 coupled by a communication network 130. The communication network 130 forms a WAN between the branch office 110 and the central office 120.

Typically, the central servers 160 in the central office 120 store the organization's data. Computers 140 make requests for the data from the central servers 160 over the communication network 130. The central servers 160 then return the data to the computers 140 over the communication network 130.

The communication network 130 typically comprises a private network (e.g., a leased line network) or a public network (e.g., the Internet). The connections to the communication network 130 from the branch office 110 and the central office 120 typically cause a bandwidth bottleneck for exchanging the data over the communication network 130. The exchange of the data between the branch office 110 and the central office 120, in the aggregate, will usually be limited to the bandwidth of the slowest link in the communication network 130.

For example, the router 150 connects to the communication network 130 by a T1 line, which provides a bandwidth of approximately 1.544 Megabits/second (Mbps). The router 170 connects to the communication network 130 by a T3 line, which provides a bandwidth of approximately 45 Megabits/second (Mbps). Even though the communication network 130 may provide an internal bandwidth greater than 1.544 Mbps or 45 Mbps, the available bandwidth between the branch office 110 and the central office 120 is limited to the bandwidth of 1.544 Mbps (i.e., the T1 connection). Connections with higher bandwidth to relieve the bandwidth bottleneck across the communication network 130 are available, but are generally expensive and have limited availability.

Moreover, many applications do not perform well over the communication network 130 due to the limited available bandwidth. Developers generally optimize the applications for performance over a local area network (LAN) which typically provides a bandwidth between 10 Mbps to Gigabit/second (Gbps) speeds. The developers of the applications assume small latency and high bandwidth across the LAN between the applications and the data. However, the latency across the communication network 130 typically will be 100 times that across the LAN, and the bandwidth of the communication network 130 will be 1/100th of the LAN.

Alternatively, many organizations select the distributed server implementation to mitigate some of the problems with the centralized server implementation. FIG. 2 is an illustration of a distributed server system 200 in the prior art. The distributed server system 200 includes a branch office 210, a central office 220, and a communication network 230. The communication network 230 forms a WAN between the branch office 210 and the central office 220.

In the distributed server system 200, the branch servers 240 (e.g., email servers, file servers and databases) are placed locally in the branch office 210, rather than solely in the central office 220. The branch servers 240 typically store all or part of the organization's data. The branch servers 240 generally provide improved application performance and data access. The branch servers 240 respond to a request for the organization's data from the local data. For each request for the data, the central servers 270 potentially do not need to transfer the data over the communication network 130 (i.e., the WAN). Synchronization and backup procedures may be implemented to maintain the coherency between the local data in the branch office 210 and the data in the central office 220.

Unfortunately, managing the distributed server system 200 is complex and costly. From a physical point of view, the distributed server system 200 with one hundred branch offices requires an order of one hundred times more equipment than the centralized server approach. Each piece of the equipment not only needs to be purchased, but also installed, managed, and repaired driving significant life cycle costs. The branch office 210 may need additional local IT personnel to perform operations because of this "Server Sprawl." Furthermore, the multiplication of managed devices means additional license costs, security vulnerabilities, and patching activities.

In distributed server implementations (e.g., the distributed server system 200), the data, including the "golden copy" or most up-to-date version of mission critical data, is often stored (at least temporarily) only on the branch servers 240 in the branch office 210. Organizations implement complex protocols and procedures for replication and synchronization to ensure that the mission critical data is backed up and kept in-sync across the WAN with the central servers 270.

Furthermore, although FIG. 1 and FIG. 2 are illustrations of a single branch office and a single central office, multiple branch offices and multiple central offices exacerbate the previously discussed problems. For example, in a centralized server implementation having multiple branches, computers in each of the multiple branch offices make requests over the WAN to central servers for the organization's data. The data transmitted by the central servers in response to the requests can saturate the available bandwidth of the central office's connection to the communication network, further decreasing application performance and data access at the multiple branch offices. In a distributed server implementation having multiple branches, the cost to provide branch servers in each of the multiple branch offices increases, as well as the problems of licensing, security vulnerabilities, patching activities, and data replication and synchronization. Moreover, different branches may simultaneously attempt to modify the same piece of information. Maintaining coherency in a distributed implementation requires complex and error prone protocols.

As well as implementing centralized servers or distributed servers, organizations also implement mechanisms for caching to improve application performance and data access. A cache is generally used to reduce the latency of the communication network (e.g., communication network 230) forming the WAN (i.e., because the request is satisfied from the local cache) and to reduce network traffic over the WAN (i.e., because responses are local, the amount of bandwidth used is reduced).

Web caching, for example, is the caching of web documents (i.e., HTML pages, images, etc.) in order to reduce web site access times and bandwidth usage. Web caching typically stores local copies of the requested web documents. The web cache satisfies subsequent requests for the web documents if the requests meet certain predetermined conditions.

One problem with web caching is that the web cache is typically only effective for rarely modified static web documents. For dynamic documents, there is a difficult trade off between minimizing network traffic and the risk of the web cache serving up stale data. The web cache may serve stale data because the web cache responds to requests without consulting the server.

Another problem is that the web cache does not recognize that two otherwise identical documents are the same if they have a different Uniform Resource Locator (URL). The web cache does not consider the content or context of the documents. Thus, the web cache caches the documents by URL or filename without a determination of the content or context of the document. Moreover, the web cache stores entire objects (such as documents) and cache-hits are binary: either a perfect match or a miss. Even where only small changes are made to the documents, the web cache does not use the cached copy of the documents to reduce network traffic.

SUMMARY OF THE INVENTION

The invention addresses some of the above problems by ensuring data integrity in network memory. A first appliance for ensuring data integrity in network memory includes a processor and a communications interface that communicates over a communication network with a second appliance of the network memory. The processor determines whether reconciliation is needed between a first peer state information in the first appliance and a second peer state information in the second appliance. The first peer state information and the second peer state information track the status of data in the network memory. The processor determines an action to reconcile the first peer state information with the second peer state information based on a positive determination that the reconciliation is needed. The processor then performs the action to reconcile the first peer state information with the second peer state information.

In some embodiments, the first peer state information and the second peer state information comprise the status of the data in the network memory locally accessible to the first appliance and the status of the data in the network memory locally accessible to the second appliance. The processor may determine whether reconciliation is needed based on discovery of the first peer state information and discovery of the second peer state information. The processor may determine whether reconciliation is needed based on time. The processor may also determine whether reconciliation is needed based on an error condition when obtaining the data from the network memory. The processor may further generate and transmit an error message over the communication network between the first appliance and the second appliance based on the error condition.

In further embodiments, the processor may exchange the first peer state information in the first appliance with the second peer state information in the second appliance. The processor may also update the status of the data in the first peer state information with the status of the data in the second peer state information. The processor may transmit a range of addresses of the network memory in the first peer state information and in the second peer state information over the communication network between the first appliance and the second appliance.

The first appliance ensures data integrity in the network memory by discovering the second peer state information in the second appliance and reconciling between the first peer state information and the second peer state information. The first appliance advantageously provides up-to-date data access by transparent discovery and reconciliation operations. The first appliance determines the status of data in the network memory that is locally accessible to the second appliance. If the first appliance knows that the data is locally accessible to the second appliance, the first appliance can take advantage of the updated peer state information to avoid or limit transmission of duplicate data over the communication network to the second appliance. The first appliance reduces network traffic over the communication network and avoids saturating available bandwidth during discovery and reconciliation operations.

BRIEF DESCRIPTION OF THE DRAWINGS

FIG. 7A and FIG. 7B are a message sequence chart for the network memory system where a portion of the response to the data request is locally accessible to the branch appliance, in an exemplary implementation of the invention;

DETAILED DESCRIPTION OF THE INVENTION

The present invention ensures data integrity in network memory. In order to better understand the present invention, aspects of the environment within which the invention operates will first be described. The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

Network Memory Architecture and Operations

To provide improved application performance and data access, the network memory system generally comprises a first appliance and a second appliance. The first appliance receives data and determines whether a portion of the data is locally accessible to the second appliance. The first appliance generates an instruction based on the determination and transfers the instruction to the second appliance through the communication network.

The network memory system provides that the second appliance processes the instruction to obtain the data and transfers the data to a computer. The data may be locally accessible to the second appliance, and the transfer to the computer may occur faster than transferring the data over the communication network. Accordingly, the second appliance transfers the data to computer without the first appliance transferring the data over the communication network that may have a high latency and low bandwidth. Thus, the network memory system operates to reduce latency and network traffic over the communication network.

Figure 1:
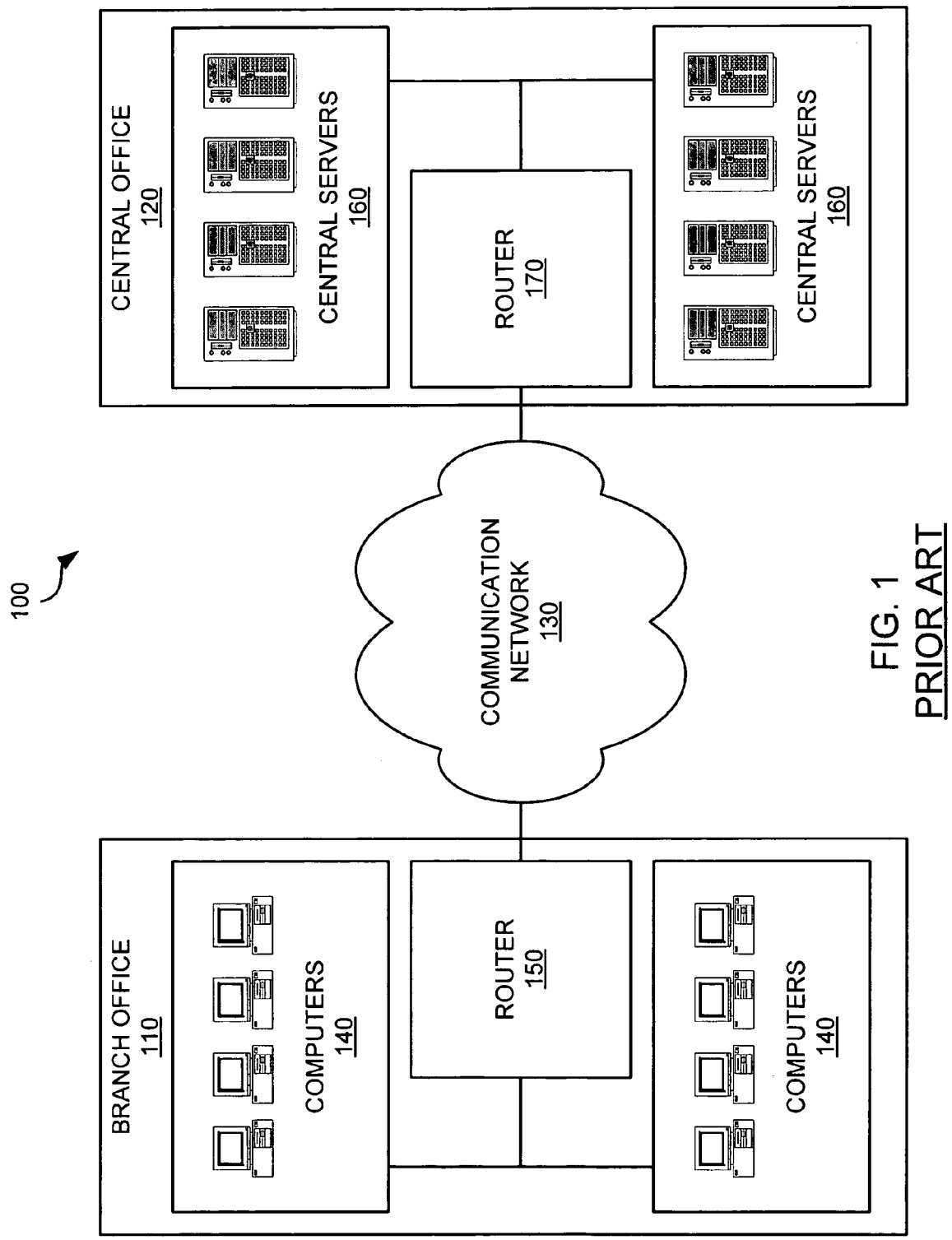
FIG. 1 is an illustration of a centralized server system in the prior art.
Figure 2:
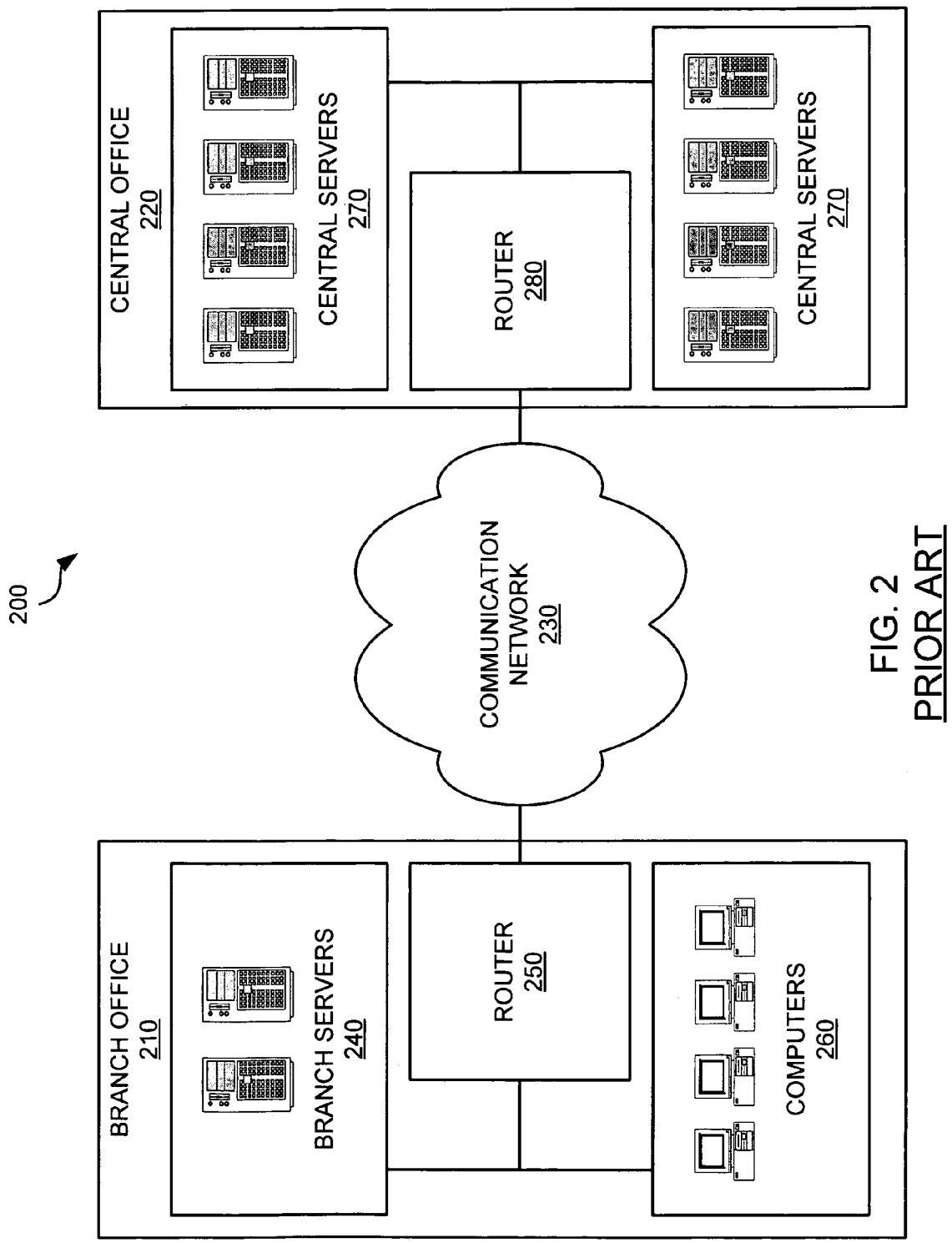
FIG. 2 is an illustration of a distributed server system in the prior art.
Figure 3:
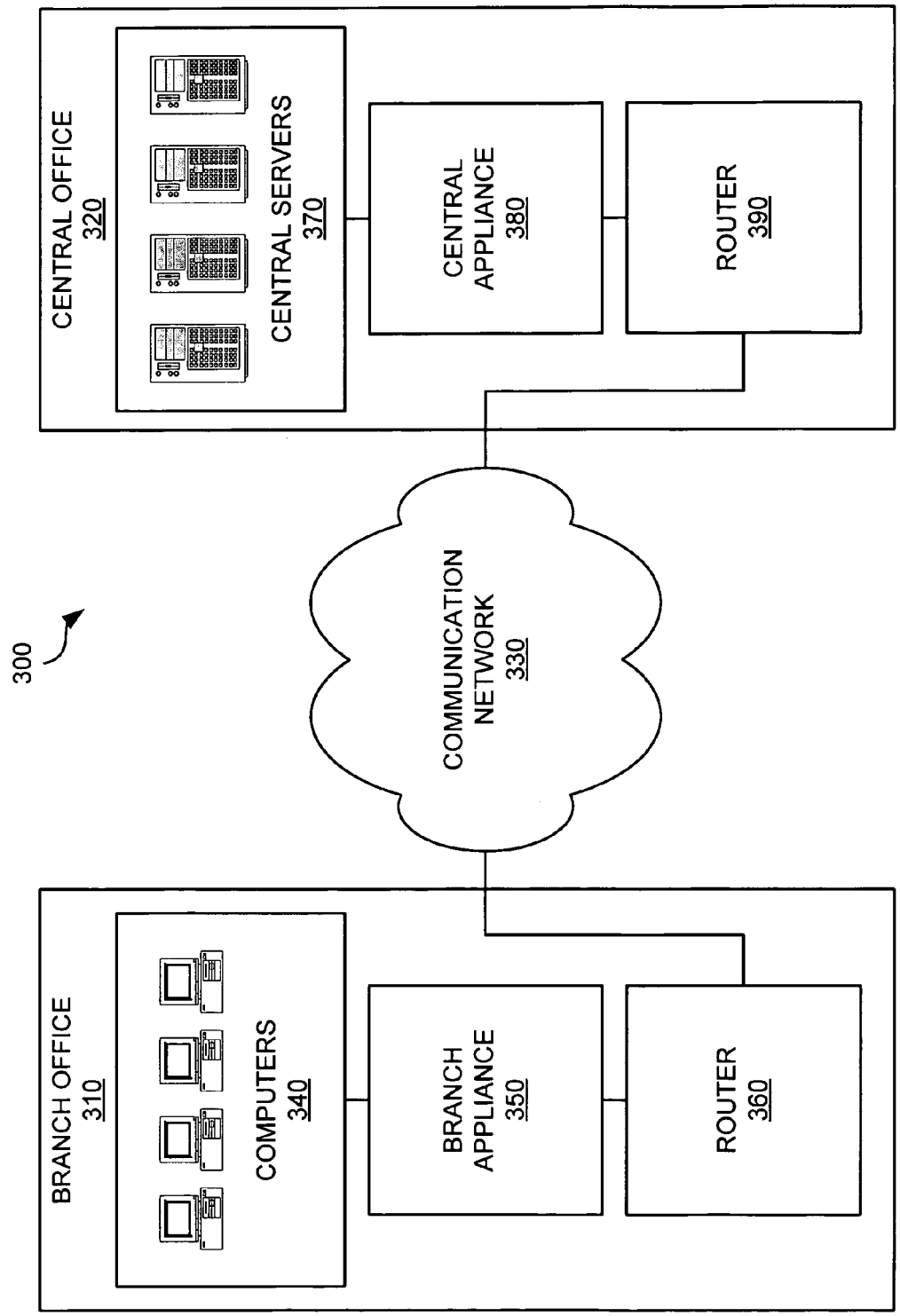
FIG. 3 is an illustration of a network memory system, in an exemplary implementation of the invention.

FIG. 3 is an illustration of a network memory system 300, in an exemplary implementation of the invention. The network memory system 300 includes a branch office 310, a central office 320, and a communication network 330. The branch office 310 includes computers 340, a branch appliance 350, and a router 360. The central office 320 includes central servers 370, a central appliance 380, and a router 390.

In the branch office 310, the computers 340 are linked to the branch appliance 350. The branch appliance 350 is linked to the router 360. The router 360 is coupled to the communication network 330. In the central office 320, the central servers 370 are linked to the central appliance 380. The central appliance 380 is linked to the router 390. The router 390 is coupled to the communication network 330.

The principles discussed herein are equally applicable to multiple branch offices (not shown) and to multiple central offices (not shown). For example, the network memory system 300 may include multiple branch offices and/or multiple central offices coupled to the communication network 330. Branch office/branch office communication and central office/central office communication, as well as multi-appliance and/or multi-node communication and bi-directional communication are further within the scope of the disclosure. However, for the sake of simplicity, the disclosure illustrates the network memory system 300 having the single branch office 310 and the single central office 320, and the respective branch office 310/central office 320 communication.

The communication network 330 comprises hardware and/or software elements that enable the exchange of information (e.g., voice and data) between the branch office 310 and the central office 320. Some examples of the communication network 330 are a private wide-area network (WAN), and the Internet. Typically connections from the branch office 310 to the communication network 330 (e.g., from the router 360 and the router 390) are ISDN, T1 lines (1.544 Mbps), and possibly broadband connections such as digital subscriber lines (DSL) and cable modems. Other examples are T3 lines (43.232 Mbps), OC3 (155 Mbps), and OC48 (2.5 Gbps), although more costly and more likely used for interconnection at the central office 320 or as the backbone of the communication network 330.

The branch appliance 350 comprises hardware and/or software elements configured to receive data (e.g., email, files, and database transactions), determine whether a portion of the data is locally accessible to an appliance (e.g., the central appliance 380), generate an instruction based on the determination, and transfer the instruction to the appliance. The branch appliance 350 also comprises hardware and/or software elements configured to receive an instruction from an appliance (e.g., the central appliance 380), process the instruction to obtain data, and transfer the data to a computer (e.g., the computers 340). One example of the branch appliance 350 is described below with respect to FIG. 8. The operations of the branch appliance 350 are discussed in further detail below in FIGS. 4, 5, 6, and 7A-7B.

Locally accessible data comprises any data transferable to the computer (e.g., the computers 340 and the central servers 370) by an appliance (e.g., the branch appliance 350 and the central appliance 380) without transferring the data over the communication network 330. In some examples, the locally accessible data is stored in random access memory (RAM) in the branch appliance 350, on a hard drive in the branch appliance 350, and a combination of data stored in RAM and on one or more hard drives in the branch appliance 350. In another example, the locally accessible data is accessible by the branch appliance 350 over a communication network (other than the communication network 330), such as data stored in a network attached storage (NAS) device that is internal or external to the branch office 310. In still another example, the locally accessible data is stored in a database. The database may be stored in RAM, on a hard disk, a combination of RAM and hard disks, in a NAS device, and/or in other optical and flash storage devices.

The instruction comprises any message or signal that indicates to an appliance (e.g., the branch appliance 350 and the central appliance 380) an action to perform with the data. Some examples of the instruction indicate to the appliance to store the data, to retrieve the data, and to forward the data to the computer (e.g., the central servers 370 and the computers 340). The instruction may be explicit, and implicit based on instructions indicating to store or retrieve the data. In some embodiments, the instruction indicates an index within a database for storing and retrieving the data.

The central appliance 380 comprises hardware and/or software elements configured to receive data, determine whether a portion of the data is locally accessible to an appliance (e.g., the branch appliance 350), generate an instruction based on the determination, and transfer the instruction to the appliance. The central appliance 380 also comprises hardware and/or software elements configured to receive an instruction from an appliance (e.g., the branch appliance 350), process the instruction to obtain the data, and transfer the data to a computer (e.g., the central servers 370). One example of the central appliance 380 is described below with respect to FIG. 9. The operations of the central appliance 380 are discussed in further detail below in FIGS. 4, 5, 6, and 7A-7B.

As illustrated, the branch appliance 350 is configured in-line (or serially) between the computers 340 and the router 360. The central appliance 380 is also configured serially between the central servers 370 and the router 390. The branch appliance 350 and the central appliance 380 transparently intercept network traffic between the computers 340 and the central servers 370. For example, the central appliance 380 transparently intercepts data sent from the central servers 370 and addressed to the computers 340. The computers 340 and the central servers 370 advantageously require no additional configuration because the branch appliance 350 and the central appliance 380 operate transparently.

Alternatively, the branch appliance 350 and the central appliance 380 are configured as an additional router or gateway. As a router, for example, the branch appliance 350 appears to the computers 340 as an extra hop before the router 360. In some embodiments, the branch appliance 350 and the central appliance 380 provide redundant routing or peer routing with the router 360 and the router 390. Additionally, in the bridge and router configurations, the branch appliance 350 and the central appliance 380 provide failure mechanisms, such as, fail-to-open (e.g., no data access) or fail-to-wire (e.g., a direct connection to the router 360).

It will be understood that the branch appliance 350 and the central appliance 380 perform bi-directional communication. For example, data sent to the branch appliance 350 from the central appliance 380 may be stored in a location locally accessible to the central appliance 380 and in a location locally accessible to the branch appliance 350. If the data is to be transferred again from the central appliance 380 to the branch appliance 350, the central appliance 380 may determine that the data is locally accessible to the branch appliance 350 and generate an instruction to the branch appliance 350 to retrieve the data. The central appliance 380 transfers the instruction to the branch appliance 350 and the branch appliance 350 processes the instruction to obtain the data. If later, the branch appliance 350 is to transfer the entire data back to the central appliance 380, the branch appliance 350 may use the fact that the central appliance 380 has before transferred the data to the branch appliance 350. The branch appliance 350 therefore determines that the data is locally accessible to the central appliance 380 and generates an instruction to the central appliance 380 to retrieve the data. The branch appliance 350 transmits the instruction to the central appliance 380 and the central appliance 380 processes the instruction to obtain the data. Therefore, an appliance (e.g., the branch appliance 350 and the central appliance 380) in the network memory system 300 advantageously uses data transferred to and from the appliance to reduce network traffic with other appliances in the network memory system 300.

The network memory system 300 advantageously provides increased productivity, reduced IT costs, and enhanced data integrity and compliance. For example, the network memory system 300 achieves the simple administration of centralized server systems whereby the central servers 370 store the primary copy of the data. The network memory system 300 improves application performance and data access in the branch office 310 and the central office 320 because not every response to a data request travels over the communication network 330 from the central servers 370. The branch appliance 350 and the central appliance 380 also store to and retrieve from a local copy of the data for subsequent exchanges of the data.

Additionally, the network memory system 300 does not cache the data in the traditional sense. The data may be retrieved locally even if the URL or filename for the data is different because the data may be identified by a pattern for the data itself and not by the URL or filename. Furthermore, unlike web caching, the network memory system 300 ensures that the data is coherent by forwarding messages (e.g., data requests and responses) between the computers 340 and the central servers 370. For example, web caching operates by locally intercepting messages for an authoritative source (e.g., a web server) and responding to the messages such that the web server potentially never sees the messages. In some cases, particularly with dynamic content, the locally cached copy may be stale or out-of-date. Advantageously, the network memory system 300 provides the data coherency and up-to-date data by the transparent operation of the network memory system 300 and the principle in which messages are transferred end-to-end (e.g., from the computer 340 to the central servers 370), even though the messages and/or the data may not traverse the communication network 330.

The network memory system 300 does not have the higher cost of distributed server systems because the branch appliance 350 and the central appliance 380 provide benefits across all applications and displace several distributed devices and caches, particularly in multiple branch implementations. In some embodiments, the branch appliance 350 and the central appliance 380 provide internal storage for a secondary copy of the data. The network memory system 300 also reduces the hardware and license costs for the branch office 310 and the central office 320 by eliminating the need for the numerous distributed devices. Further, the network memory system 300 minimizes the security vulnerabilities and patching activities commonly associated with the distributed systems. Management of the branch appliance 350 and the central appliance 380 is simpler than the management of a remote distributed server. Unlike remote servers, there is no need to configure user accounts, permissions, and authentication schemes on the branch appliance 350 and the central appliance 380.

Figure 4:
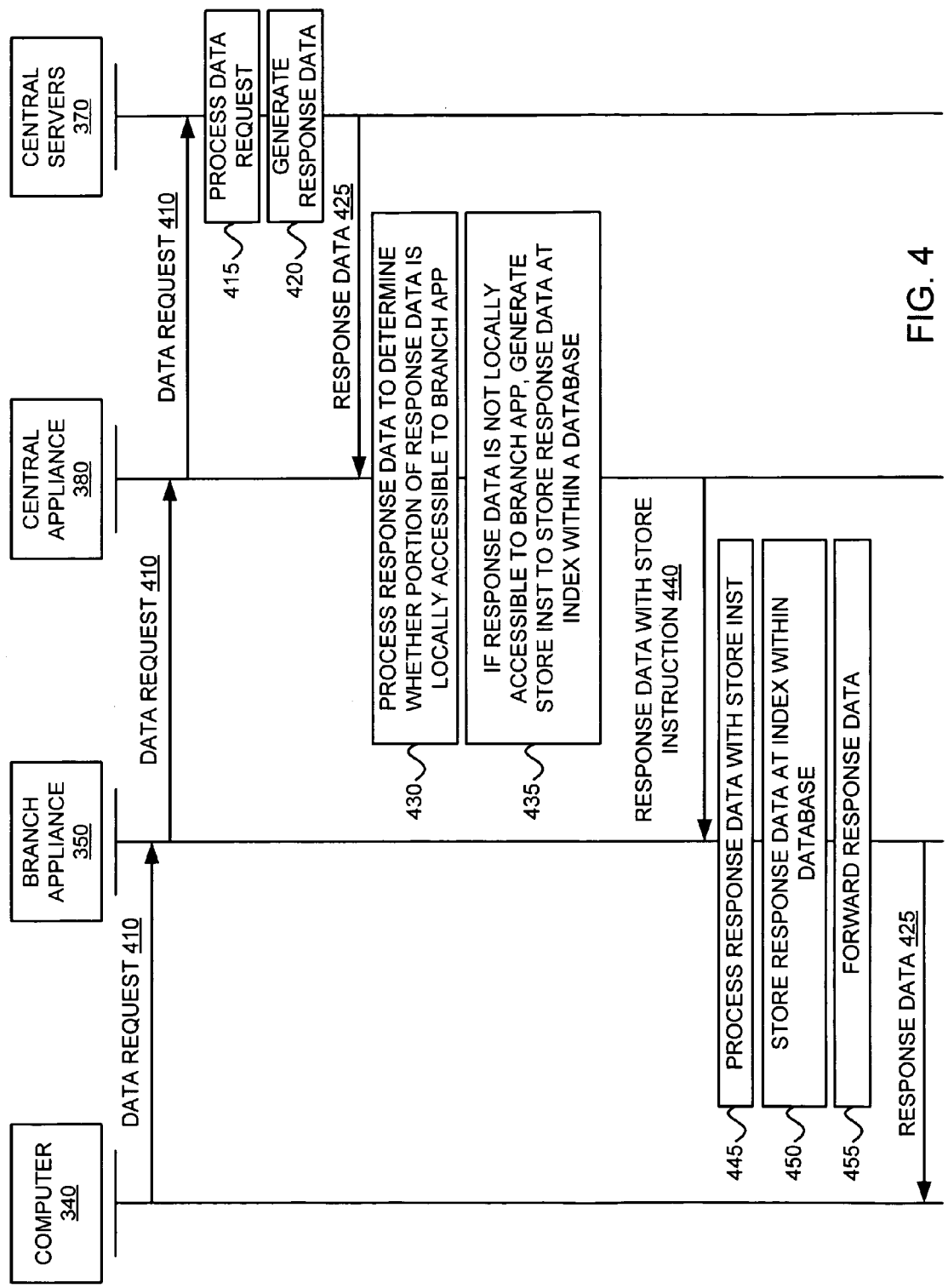
FIG. 4 is a message sequence chart for the network memory system where a response to a data request is not locally accessible to a branch appliance, in an exemplary implementation of the invention.

FIG. 4 is a message sequence chart for the network memory system 300 where a response data 425 to a data request 410 is not locally accessible to the branch appliance 350, in an exemplary implementation of the invention. In this example, the computer 340 transmits the data request 410 through the branch appliance 350 and the central appliance 380 to the central servers 370. Some examples of the data request 410 are requests for an email attachment, a file, a web page, and a database query.

In sequence 415, the central servers 370 process the data request 410, and in sequence 420, the central servers 370 generate the response data 425 based on the data request 410. Some examples of the response data 425 are an email message and attachment, a file, a web page, and results retrieved or obtained from the database query. The central servers 370 then transmit the response data 425 to the central appliance 380. Alternatively, in some embodiments, the central server 370 addresses the response data 425 directly to the computer 340, however, during transmission, the central appliance 380 transparently intercepts the response data 425. In sequence 430, the central appliance 380 processes the response data 425 to determine whether a portion of the response data 425 is locally accessible to the branch appliance 350.

Figure 5:
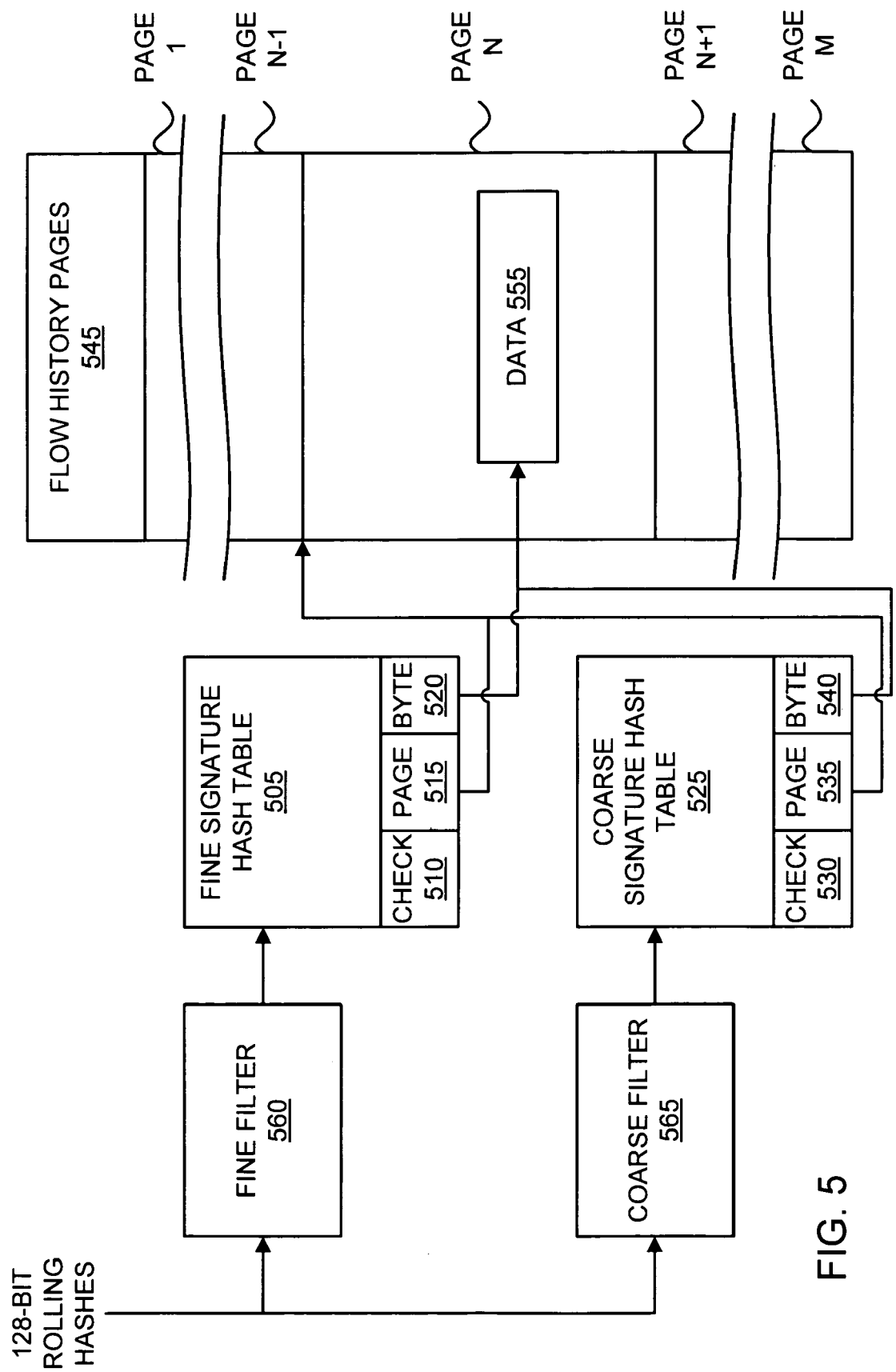
FIG. 5 is an illustration of data structures for the network memory system to determine whether a portion of the data is locally accessible to the branch appliance, in an exemplary implementation of the invention.

FIG. 5 is an illustration of data structures for the network memory system 300 to determine whether a portion of the data is locally accessible to the branch appliance 350, in an exemplary implementation of the invention. In this example, the data structures include a fine signature hash table (SHT) 505, a coarse signature hash table (SHT) 525, and flow history pages (FHPs) 545. The fine SHT 505 includes one or more entries comprising a check field 510, a page field 515, and a byte field 520. The coarse SHT 525 includes one or more entries comprising a check field 530, a page field 535, and a byte field 540. The FHPs 545 include one or more pages (e.g., page 1-M). In this example, the one or more pages of the FHPs 545 are a subset of pages tracked or monitored in the network memory. The set of pages tracked or monitored is a subset (e.g., proper or improper subset) of total pages in the network memory. Each page (e.g., page N) in the FHPs 545 stores data 555.

An appliance of the network memory system 300 (e.g., the branch appliance 350 and the central appliance 380) calculates a signature or hash at every byte boundary of a data flow (e.g., the response data 425) to be sent across the communication network 330. In some embodiments, the data flow includes packets that are in the same Internet Protocol (IP) flow, as defined by the IP header five tuple of source address, source port, destination address, destination port, and protocol. The hashes may be influenced by preceding bytes in the data flow. For example, the hashes are influenced by approximately the n previous bytes, where n determines the fingerprint size. Some examples of calculating the hashes are cyclical redundancy checks (CRCs) and checksums over the previous n bytes of the data flow. In some embodiments, rolling implementations of CRCs and checksums are used where a new byte is added, and a byte from n bytes earlier is removed. To maximize the ability to determine whether a portion of the data flow exists in another appliance in the network memory system 300, the hash calculation may span across successive IP packets in the data flow. In other embodiments, the hash calculation ignores patterns that span one or more IP packet boundaries in the data flow, and the hashes are calculated within a single IP packet.

Each calculated hash is filtered by a fine filter 560 and a coarse filter 565. The appliance designates the locations in the data flow which meet the fine and coarse filter criteria as fine and coarse sync-points, respectively. The fine filter 560 and the coarse filter 565 have different filter criteria. Typically, the filter criteria for the coarse filter 560 is more restrictive and may be used to further filter those hashes which pass the fine filter. In other words, the fine filter produces a fine comb of sync-points and the coarse filter produces a coarse comb of sync-points. One example of the filter criteria is the null filter which allows results in sync-points at all locations. In another example, the filter criteria declares a fine sync-point when the top five bits of the hashes are all zeros and a coarse filter criteria which stores or compares hashes when the top ten bits of the hashes are all zeros. The hash at the fine sync-points index the fine SHT 505 and the hash at the coarse sync-points index the coarse SHT 525. For example, the index could be derived from the hash by using a number of low order bits from the hash. The filter criteria affect the sizing of the SHTs 505 and 525 and the probability of matching a hash in the SHTs 505 and 525. The more sync-points that are generated the easier repeated data is identified but, the larger the tables (i.e., the SHTs 505 and 525) need to be in order to index a given amount of information for the data flow. Having a coarse and fine table helps optimize this tradeoff. Alternative implementations may use a single table or multiple tables.

The fine SHT 505 is populated with hashes as the data 555 (e.g., the response data 425) is stored and when the data 555 is recalled from disk or other locally accessible storage. The fine SHT 505 finely indexes the data 555. In some embodiments, the fine SHT 505 holds approximately one entry for every 100 bytes of the data 555. The coarse SHT 525 is populated as the data 555 is stored and is coarsely indexed. For example, the coarse SHT 525 may hold one entry for approximately every 4 kilobytes (KB) of the data 555. The fine SHT 505 and the coarse SHT 525 may be considered short term and long term memory index structures, respectively.

The appliance of the network memory system 300 stores all or part of the calculated hashes in or compares all or part of the hashes to the check field 510 in the SHTs 505 and 525. For example, the central appliance 380 verifies a "hit" in the fine SHT 505 by comparing the entire calculated hash or a number of residual bits of the calculated hash to the check field 510. If the central appliance 380 finds no matching hashes in the fine SHT 505 or in the coarse SHT 525, the central appliance 380 determines that the response data 425 is not locally accessible to the branch appliance 350. Each calculated hash for the response data 425 in the fine SHT 505 and the coarse SHT 525 is stored or compared depending on the filter criteria for the fine filter 560 and the coarse filter 565.

The appliance of the network memory system 300 indexes each entry in the fine SHT 505 and the coarse SHT 525 to a page (e.g., by setting the page field 515 and the page field 535 to address page N) and byte offset (e.g., by setting the byte field 520 and the byte field 540 to a byte offset of the data 555) in the FHPs 545. For example, the central appliance 380 stores the response data 425 in the FHPs 545 at the page pointed to by the page field 515 and 535 at the byte offset indicated by the byte field 520 and 540. The byte field 520 of each hash in the fine SHT 505 for the response data 425 points to the start of a fine sync-point. The byte field 540 of each hash in the coarse SHT 525 for the response data 425 points to the start of a coarse sync-point.

In this example, the branch appliance 350 includes a fine SHT 505, a coarse SHT 525, and a FHP 545 data structure, and the central appliance 380 includes a fine SHT 505, a coarse SHT 525, and a FHP 545 data structure. Each appliance in the network memory system 300 maintains the separate data structures, with may include separate filter criteria for the fine filters 560 and the coarse filters 565. The branch appliance 350 and the central appliance 380 each write the data 555 to an assigned page (e.g., the page N or the page N+1) and may reference a page assigned to another appliance in the network memory system 300. Appliances in the network memory system 300 may discover and reconcile information about pages assigned to other appliances as explained below with regard to FIGS. 9-17B.

Referring again to FIG. 4, the central appliance 380 proceeds with the determination that no portion of the response data 425 is locally accessible to the branch appliance 350. In sequence 435, the central appliance 380 generates a store instruction 440. The store instruction 440 indicates to the branch appliance 350 to store the response data 425 at an index in a database. The central appliance 380 attaches the store instruction 440 to the response data 425. The central appliance 380 then transmits the response data 425 with the store instruction 440 to the branch appliance 350.

In sequence 445, the branch appliance 350 processes the response data 725 with the store instruction 440. In sequence 450, based on the store instruction 440, the branch appliance 350 stores the response data 425 in the branch appliance 350 at the index within the database. In this example, the branch appliance 350 stores the response data 425 in the FHPs 545 at the page and at a particular byte offset indicated by the index. In sequence 455, the branch appliance 350 forwards the response data 425 to the computer 340. As discussed previously, the branch appliance 350 may forward the data to the computer based on explicit and implicit instructions.

Figure 6:
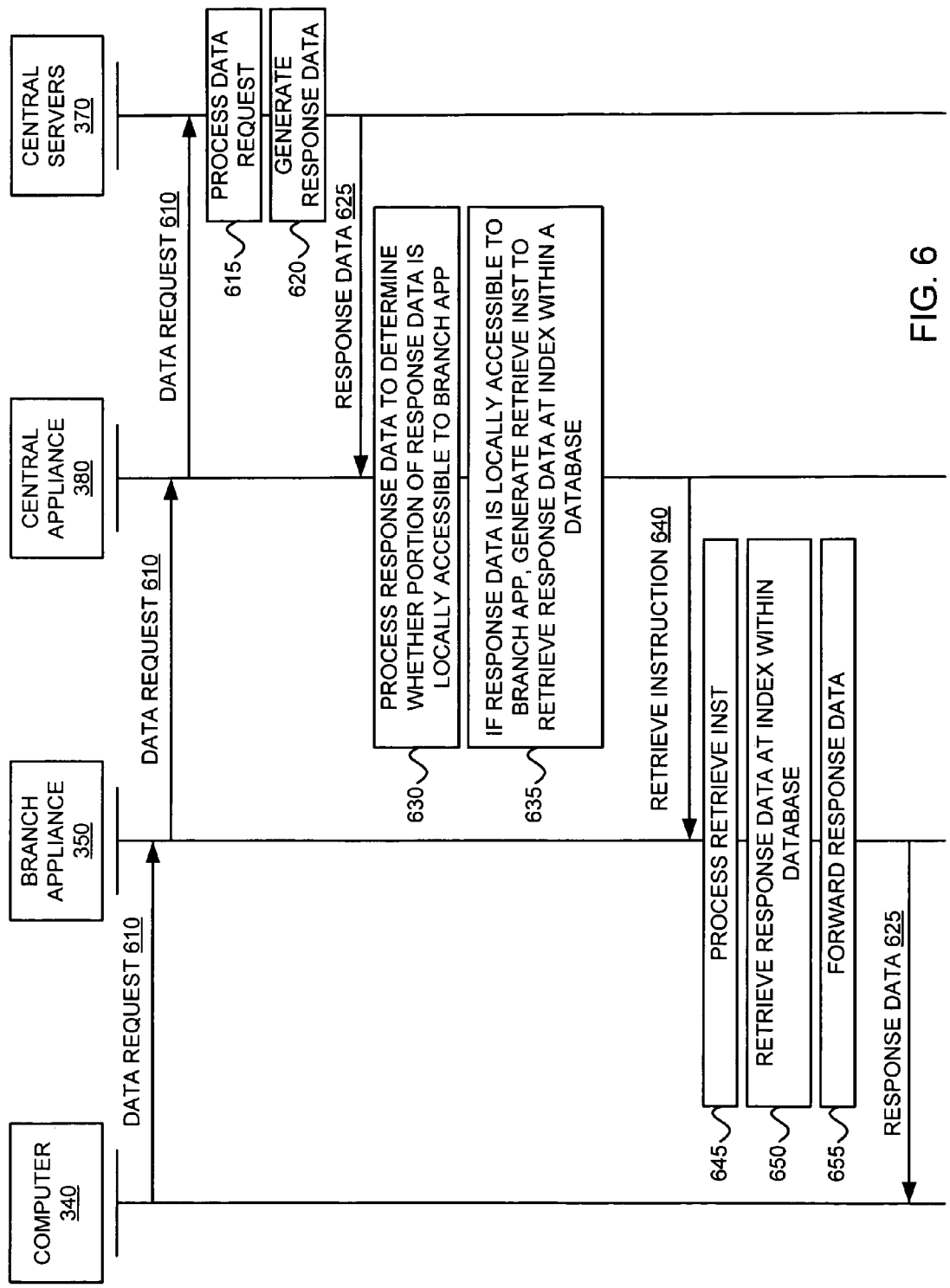
FIG. 6 is a message sequence chart for the network memory system where the response to the data request is locally accessible to the branch appliance, in an exemplary implementation of the invention.

FIG. 6 is a message sequence chart for the network memory system 300 where a response data 625 to a data request 610 is locally accessible to the branch appliance 350, in an exemplary implementation of the invention. In this example, the computer 340 transmits the data request 610 to the central servers 370 through the branch appliance 350 and the central appliance 380. In sequence 615, the central servers 370 process the data request 610. In sequence 620, the central servers 370 generate a response data 625 based on the data request 610. The central servers 370 then transmit the response data 625 to the central appliance 380.

In sequence 630, the central appliance 380 processes the response data 625 to determine whether a portion of the response data 625 is locally accessible to the branch appliance 350. The central appliance 380 again generates hashes for the response data 625, as previously described with respect to FIGS. 4 and 5. The central appliance 380 filters the generated hashes through the fine filter 560 and the coarse filter 565 to determine fine and/or coarse sync-points. The central appliance 380 looks up the fine sync-points in the fine SHT 505 and the coarse sync-points in the coarse SHT 525. If any of the hashes for the response data 625 match (i.e., the check bytes match in either the fine SHT 505 and/or the coarse SHT 525), then additional checks (such as direct forward comparisons and backward memory comparisons between the response data 625 and the data 555 in the FHPs 545) may also be made to determine the size of the matching region. Further checks using the page state information 550 determine which portion of the response data 625 is locally accessible to the branch appliance 350.

Based on the determination that the entire response data 625 is locally accessible to the branch appliance 350, in sequence 635, the central appliance 380 generates a retrieve instruction 640 that indicates to the branch appliance 350 to retrieve the response data 625 at an index within the database. The central appliance 380 then transmits only the retrieve instruction 640 to the branch appliance 350. In this manner, the central appliance 380 optimizes network traffic over the communication network 330. If the retrieve instruction 640 is smaller in size than the response data 625, the central appliance 380 transmits the retrieve instruction 640. If the retrieve instruction 640 is larger than the response data 625, the central appliance 380 transmits the response data 625 instead.

In sequence 645, the branch appliance 350 processes the retrieve instruction 640. In sequence 650, based on the retrieve instruction 640, the branch appliance 350 retrieves the response data 625 at the index within the database. In sequence 655, the branch appliance 350 forwards the response data 625 to the computer 340.

Figure 7A:
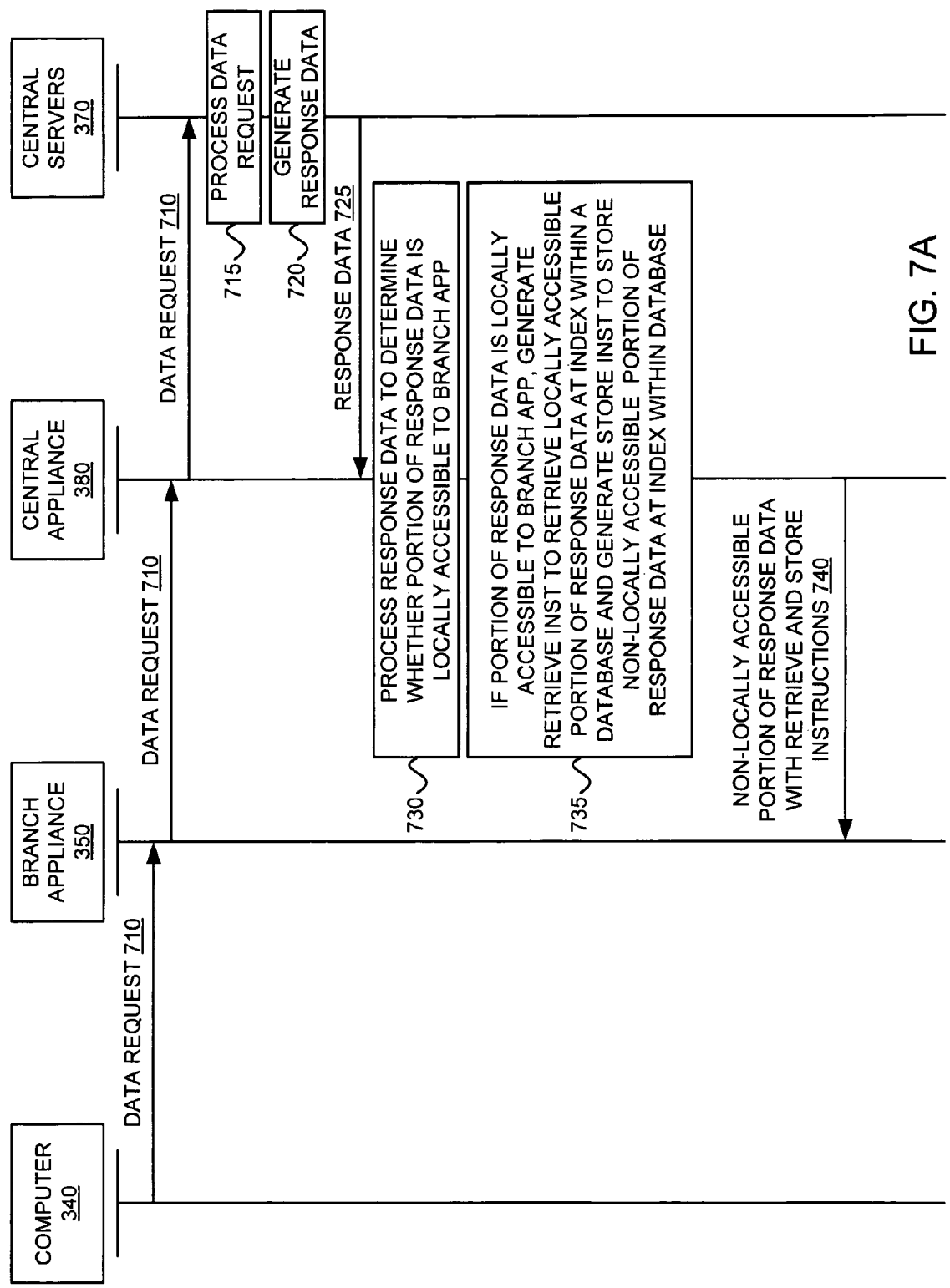

FIG. 7A and FIG. 7B are a message sequence chart for the network memory system 300 where a portion of a response data 725 to a data request 710 is locally accessible to the branch appliance 350, in an exemplary implementation of the invention. The computer 340 transmits the data request 710 to the central servers 370 through the branch appliance 350 and the central appliance 380. In sequence 715, the central servers 370 process the data request 710. In sequence 720, the central servers 370 generate a response data 725 based on the data request 710. The central servers 370 then transmit the response data 725 to the central appliance 380.

In sequence 730, the central appliance 380 processes the response data 725 to determine whether a portion of the response data 725 is locally accessible to the branch appliance 350. The central appliance 380 computes hashes for the response data 725 and filters the hashes through the fine filter 560 and the coarse filter 565 to determine any fine and coarse sync-points. The central appliance 380 then looks up any fine sync-points in the fine SHT 505 and coarse sync-points in the coarse SHT 525. In this example, only a portion of the response data 725 is locally accessible to the branch appliance 350, meaning that although the central appliance 380 finds at least one match in the SHTs 505 and 525, additional checks (such as the direct forward comparison and the backward memory comparison with the response data 725 and the data 555) determine that only a portion of the response data 725 is locally accessible to the branch appliance 350.

The central appliance 380 stores the generated hashes for the non-locally accessible portion of the response data 725 (otherwise known as the deltas) in the SHTs 505 and 525, and stores the deltas in the FHPs 545. The central appliance 380 will transmit the deltas (i.e., the portion of the response data 725 that is not locally accessible) to the branch appliance 350.

In sequence 735, the central appliance 380 generates retrieve and store instructions 740. The retrieve instruction indicates to the branch appliance 350 to retrieve the locally accessible portion of the response data 725 at an index within the database. The store instruction indicates to the branch appliance 350 to store the deltas at an index within the database. The store instruction may also indicate to the branch appliance 350 to store another copy of the portion of the response data 725 locally accessible to the branch appliance 350 with the deltas. The entire response data 725 will then be locally accessible in the database to the branch appliance 350. The central appliance 380 attaches the deltas to the retrieve and store instructions 740. The central appliance 380 then transmits the non-locally accessible portion of the response data 725 with retrieve and store instructions 740 to the branch appliance 350.

In sequence 745, the branch appliance 350 processes the non-locally accessible portion of the response data 725 with retrieve and store instructions 740. In sequence 750, based on the retrieve instruction, the branch appliance 350 retrieves the locally accessible portion of the response data 725 at the index in the database. In sequence 755, the branch appliance 350 obtains the response data 725 from the retrieved locally accessible portion and the transferred deltas (i.e., the transferred non-locally accessible portion of the response data 725). In sequence 760, based on the store instruction, the branch appliance 350 stores the deltas (and potentially the retrieve locally accessible portion of the response data 725) at the index in the database. In sequence 765, the branch appliance 350 transmits the entire response data 725 to the computer 340.

Alternatively, in addition to the examples in FIGS. 4, 5, 6, and 7A-7B illustrating a request for the data originating from the computer 340 to the central servers 370, the computer 340 may also transmit data to the branch appliance 350 addressed to the central servers 370. The branch appliance 350 determines whether a portion of the data is locally accessible to the central appliance 380. Then, for example, if the data is locally accessible to the central appliance 380, the branch appliance 350 generates a retrieve instruction indicating to the central appliance 380 to retrieve the data and forward the data to the central server 370.

In still further embodiments, the instruction may indicate a plurality of indexes. Referring again to FIG. 7B, in sequence 750, based on the retrieve instruction indicating a plurality of indexes for the response data 725, the branch appliance 350 may retrieve the locally accessible portion of the response data 725 at different locations based on the plurality of indexes. For example, the branch appliance 350 may retrieve a portion of the response data 725 from RAM, a portion from a hard disk, and a portion from a NAS device. Similarly, in sequence 760, based on the store instruction indicating a plurality of indexes for the response data 725, the branch appliance 350 may stores the deltas in the database and after obtaining the entire response data 725, store the entire response data 725 in a different location (e.g., in a different location in the database, in a disk drive, or in a NAS device) than the previously locally accessible portion.

Figure 8:
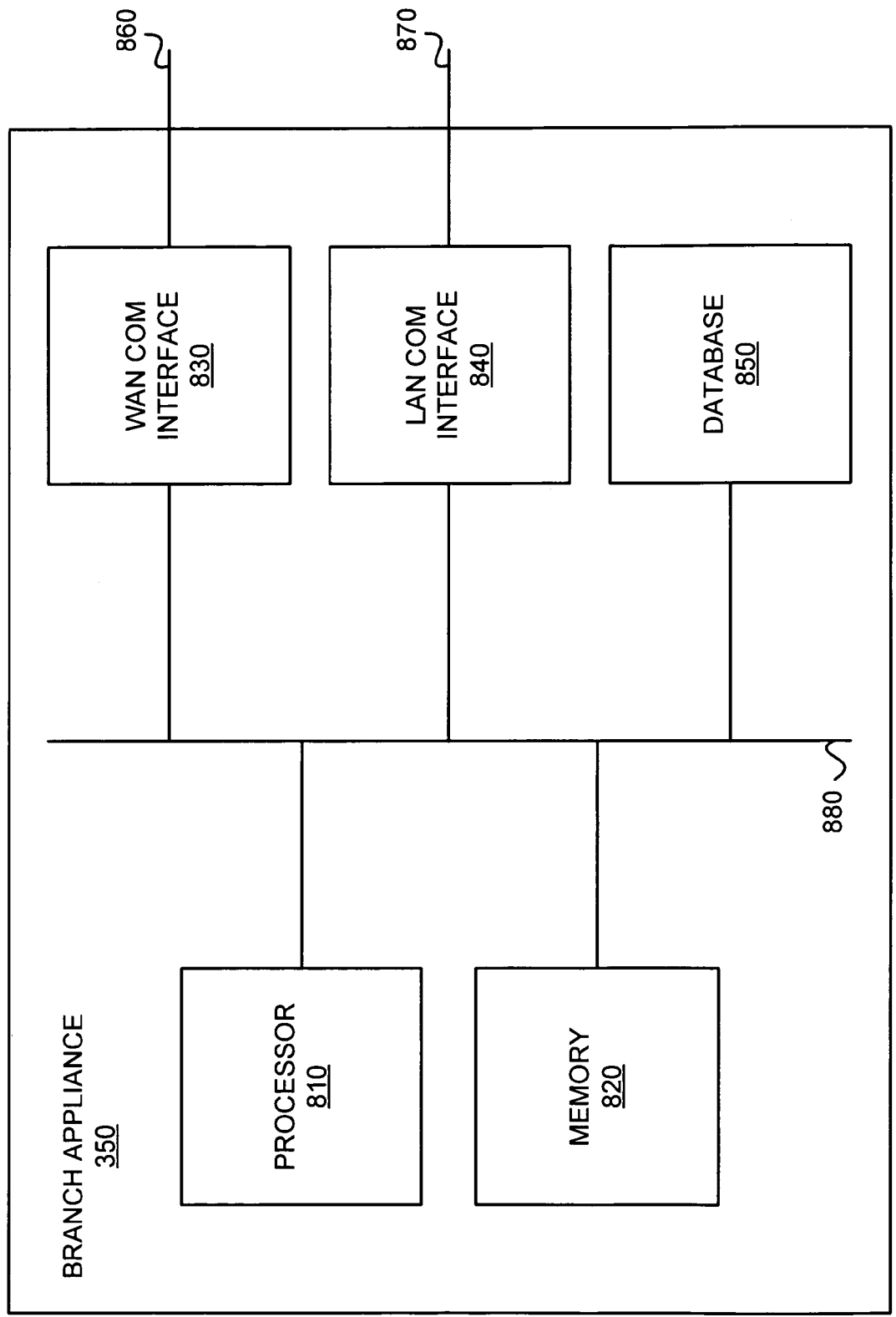
FIG. 8 is a block diagram of the branch appliance, in an exemplary implementation of the invention.

FIG. 8 is a block diagram of the branch appliance 350, in an exemplary implementation of the invention. The branch appliance 350 includes a processor 810, a memory 820, a WAN communication interface 830, a LAN communication interface 840, and a database 850. A system bus 880 links the processor 810, the memory 820, the WAN communication interface 830, the LAN communication interface 840, and the database 850. Line 860 links the WAN communication interface 830 to the router 360 (in FIG. 3). Line 870 links the LAN communication interface 840 to the computers 340 (in FIG. 3).

The database 850 comprises hardware and/or software elements configured to store data in an organized format to allow the processor 810 to create, modify, and retrieve the data. The database 850 may organize the data to enable the determination of whether a portion of the data is locally accessible to an appliance, and to enable quick retrieval of locally accessible data to the branch appliance 350. The hardware and/or software elements of the database 850 may include storage devices, such as RAM, hard drives, optical drives, flash memory, and magnetic tape. In some embodiments, the branch appliance 350 implements a virtual memory system with linear addresses, the locally accessible data, and the data structures discussed with respect to FIG. 5 in the database 850.

Figure 9:
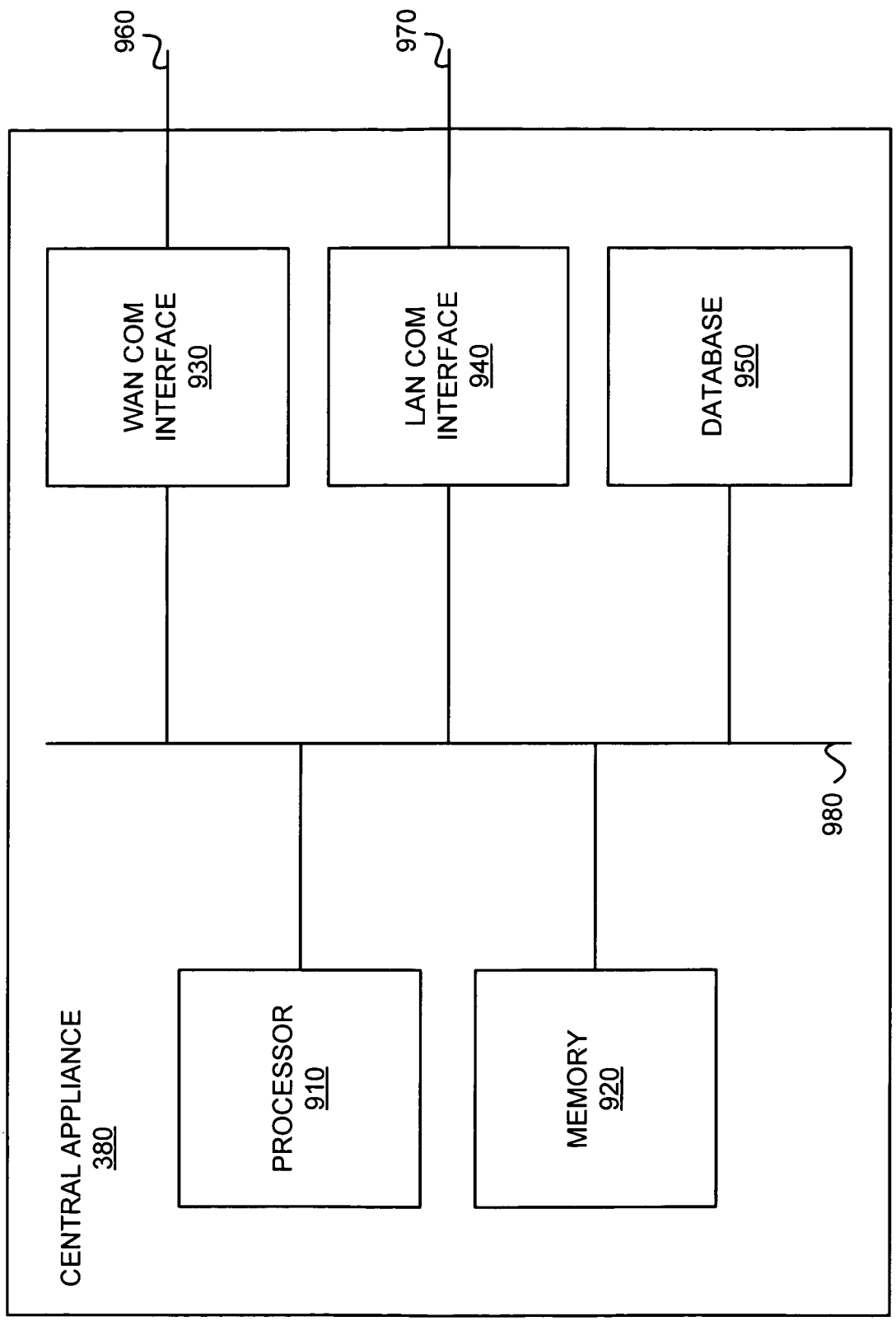
FIG. 9 is a block diagram of a central appliance, in an exemplary implementation of the invention.

FIG. 9 is a block diagram of the central appliance 380, in an exemplary implementation of the invention. The central appliance 380 includes a processor 910, a memory 920, a WAN communication interface 930, a LAN communication interface 940, and a database 950. A system bus 980 links the processor 910, the memory 920, the WAN communication interface 930, the LAN communication interface 940, and the database 950. Line 960 links the WAN communication interface 930 to the router 390 (in FIG. 3). Line 970 links the LAN communication interface 940 to the central servers 370 (in FIG. 3). In some embodiments, the branch appliance 350 and the central appliance 380 comprise the identical hardware and/or software elements. Alternatively, in other embodiments, the central appliance 380 may include hardware and/or or software elements providing additional processing, communication, and storage capacity.

Advantageously, the network memory system 300 improves application performance and data access. In some embodiments, by storing a secondary copy of the data locally accessible to the branch appliance 350 and the central appliance 380, the network memory system 300 minimizes the effects of latency and reduces network traffic over the communication network 330 to the central servers 370. Additionally, while the central servers 370 maintain the primary copy of the data, the central servers 370 potentially do not transfer the actual data over the communication network 330 for every request/response. Furthermore, accelerated access to the data locally accessible to the branch appliance 350 and the central appliance 380 is not limited to a particular application or data context.

In some embodiments, the network memory system 300 includes a secure tunnel between the branch appliance 350 and the central appliance 380. The secure tunnel provides encryption (e.g., IPsec) between the branch appliance 350 and the central appliance 380. Additionally, in other embodiments, the secure tunnel includes compression, such as header and payload compression. The secure tunnel may provide fragmentation/coalescing optimizations along with error detection and correction.

Figure 10:
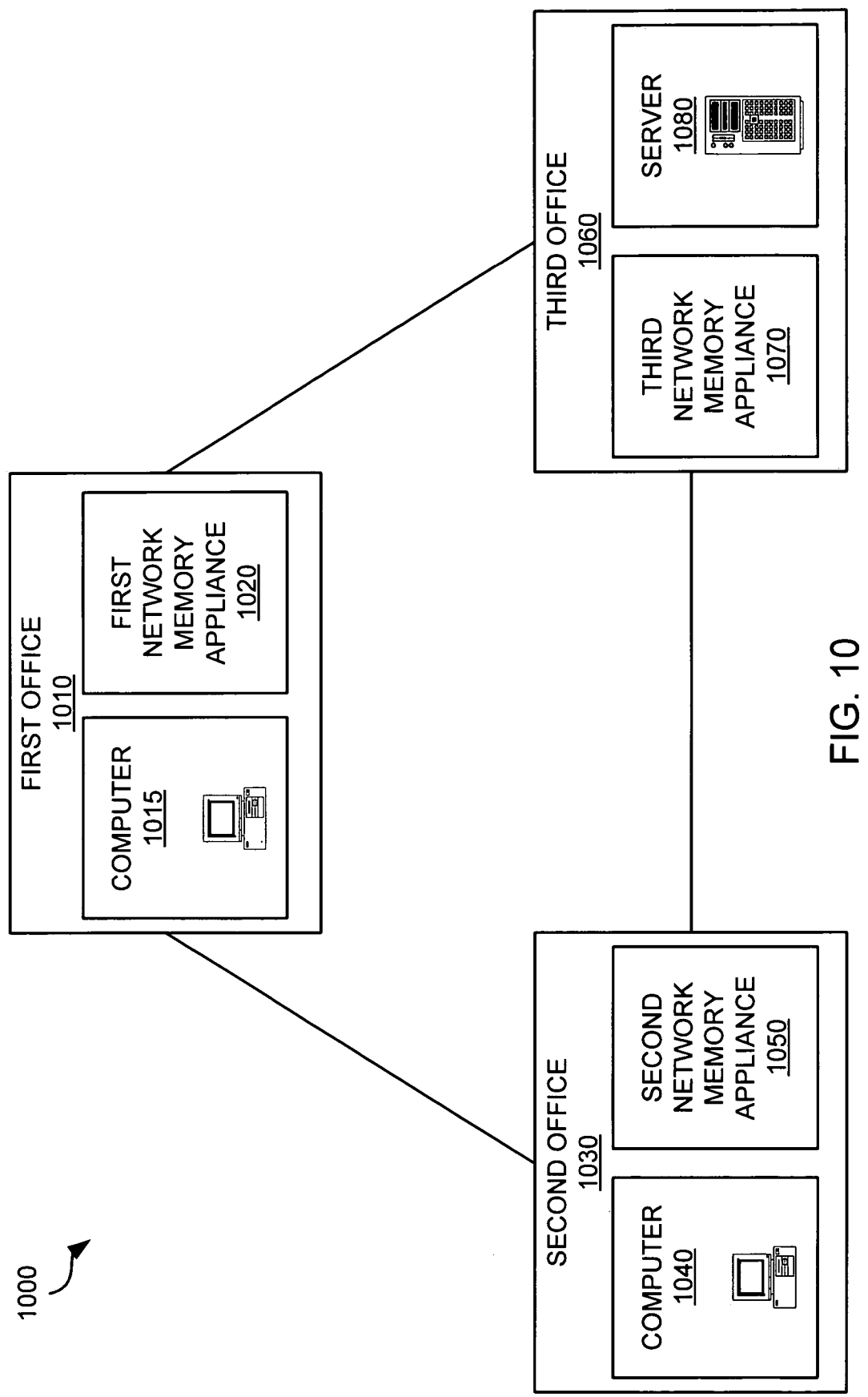
FIG. 10 is an illustration of a network memory system between a first office, a second office, and a third office, in an exemplary implementation of the invention.

FIG. 10 is an illustration of a network memory system 1000 between a first office 1010, a second office 1030, and a third office 1060, in an exemplary implementation of the invention. The first office 1010 includes a computer 1015 and a first network memory appliance (NMA) 1020. The second office 1030 includes a computer 1040 and a second NMA 1050. The third office 1060 includes a third NMA 1070 and a server 1080. The first office 1010 is linked to the second office 1030 and the third office 1060 (e.g., through routers not shown). The second office 1030 is also linked the third office 1060.

The first NMA 1020, the second NMA 1050, and the third NMA 1070 comprise hardware and/or software elements, similar to the branch appliance 350 and the central appliance 380, configured to receive data, determine whether the data is locally accessible to an appliance, generate an instruction based on the determination, and transfer the instruction to the appliance. The first NMA 1020, the second NMA 1050, and the third NMA 1070 also comprise hardware and/or software elements configured to receive an instruction from an appliance, process the instruction to obtain data, and transfer the data to a computer.

Advantageously, in this multi-office example, the network memory system 1000 provides for locally accessible data in each office. The first NMA 1020, the second NMA 1050, and the third NMA 1070 receive data, potentially destined for a computer and/or server in another office, and determine whether a portion of the data is locally accessible to an NMA in that office. To further enhance operation and the exchange of data between the first NMA 1020, the second NMA 1050, and the third NMA 1070, each NMA performs a discovery and reconciliation. During discovery and reconciliation peer state information in each NMA of the network memory system 1000 is updated. Peer state information is described further with respect to FIG. 13. In one example, each NMA updates a list of pages and/or byte ranges in the NMA with references for data locally accessible to the NMA and data locally accessible to other NMAs in the network memory system 1000.

Figure 11:
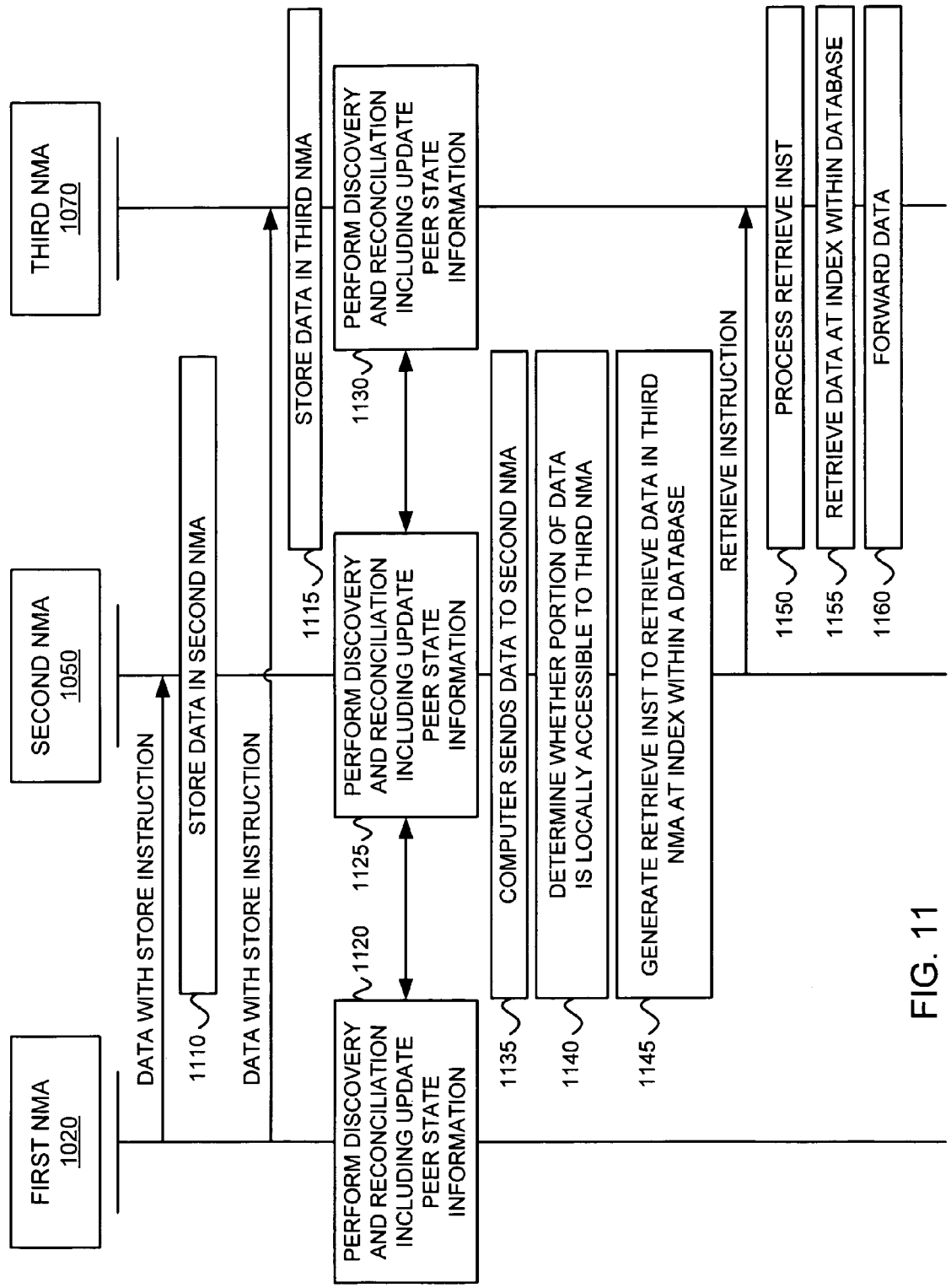
FIG. 11 is a message sequence chart for the network memory system for discovery and reconciliation, in an exemplary implementation of the invention.

FIG. 11 is a message sequence chart for the network memory system 1000 for discovery and reconciliation, in an exemplary implementation of the invention. In this example, the computer 1015 in the first office 1010 transmits data to the first NMA 1020 for the first time addressed to the computer 1040 in the second office 1030. The first NMA 1020 transmits the data with a store instruction to the second NMA 1050 indicating to store the data in a database in the second NMA 1050. In sequence 1110, the second NMA 1050 stores the data in the database, and the second NMA 1050 transmits the data to the computer 1040.

The computer 1015 in the first office 1010 then transmits the same data to the first NMA 1020 addressed for the first time to the server 1080 in the third office 1060. The first NMA 1020 transmits the data with a store instruction to the third NMA 1070 indicating to store the data in a database in the third NMA 1070. In the sequence 1115, the third NMA 1070 stores the data in the database, and the third NMA 1070 transmits the data to the server 1080.

In sequence 1120, 1125, and 1130, the first NMA 1020, the second NMA 1050, and the third NMA 1070 perform discovery and reconciliation including updating the peer state information. In this example, the first NMA 1020, the second NMA 1050, and the third NMA 1070 exchange peer state information about data in pages of the network memory each NMA has available locally. For example, to update the peer state information in the second NMA 1050, the second NMA 1050 performs a discovery and reconciliation with the first NMA 1020 and the third NMA 1070. Similarly, each NMA performs discovery and reconciliation with every other peer NMA.

During the discovery and reconciliation between the second NMA 1050 and the first NMA 1020, for example, the second NMA 1050 discovers from the first NMA 1020 that the data (transmitted from the computer 1015 to the computer 1040 and the server 1080) is locally accessible to the third NMA 1070. The peer state information of the first NMA 1020 includes references to the data and, because the first NMA 1020 transferred the data to the third NMA 1070, the peer state information indicates that the data is locally accessible to the third NMA 1070. The second NMA 1050 reconciles the references for the data in the peer state information and further indicates that data is locally accessible to the third NMA 1070.

Referring again to FIG. 11, in sequence 1135, after the discovery and reconciliation in sequences 1120, 1125, and 1130, the computer 1040 in the second office 1030 transmits the data addressed to the server 1080 in the third office 1060. The data is intercepted by the second NMA 1050, and in sequence 1140, the second NMA 1050 determines whether a portion of the data is locally accessible to the third NMA 1070. Since the discovery and reconciliation, the peer state information in the second NMA 1050 indicates that data is locally accessible to the third NMA 1070. In sequence 1145, the second NMA 1050 generates a retrieve instruction indicating to the third NMA 1070 to retrieve the data from an index within the database. The second NMA 1050 transfers the retrieve instruction to the third NMA 1070.

In sequence 1150, the third NMA 1070 processes the retrieve instruction. In sequence 1155, based on the retrieve instruction, the third NMA 1070 retrieves the data at the index within the database. In sequence 1160, the third NMA 1070 forwards the data to the server 1080.

Therefore, the network memory system 1000 provides improved application performance and data access between the first office 1010, the second office 1030, and the third office 1060. The network memory system 1000 provides access to locally accessible data, similar to distributed servers, without the complex management involved with replication and synchronization of the data among the distributed servers. Additionally, the network memory system 1000 reduces network traffic between the offices. Furthermore, discovery and reconciliation provides performance advantages by periodically or continuously updating the peer state information in each NMA.

Ensuring Data Integrity in Network Memory

Ensuring data integrity in network memory allows the network memory system 1000 to provide up-to-date data access with transparent discovery and reconciliation operations. Each NMA discovers (e.g., obtains or makes known) peer state information in other NMAs of the network memory system 1000 (e.g., remote peer state information) and reconciles (e.g., makes consistent or checks for accuracy) local peer state information in the NMA with the remote peer state information to ensure data integrity in the network memory.

In general, a first appliance (e.g., the first NMA 1020) for ensuring data integrity in network memory includes a processor and a communications interface. The communications interface communicates over a communication network with a second appliance (e.g., the second NMA 1050) of the network memory. The processor determines whether reconciliation between a first peer state information in the first appliance and a second peer state information in the second appliance is needed. The first peer state information and the second peer state information track the status of data in the network memory. The processor determines an action to reconcile the first peer state information with the second peer state information based on a positive determination that the reconciliation is needed. The processor then performs the action to reconcile the first peer state information with the second peer state information.

For example, if the first NMA 1020 knows that data contained in or representing a particular document or file is locally accessible to the second NMA 1050, the first NMA 1020 can take advantage of continuously or periodically updated local peer state information to avoid or limit retransmission of the data contained in or representing the document or file to the second NMA 1050. The network memory system 1000 can also optimize network traffic between the first office 1010, the second office 1030, and the third office 1060 even when the document or file has never actually traveled between the offices. Furthermore, the network memory system 1000 provides increased productivity and reduced IT costs as discovery and reconciliation operations mitigate downtime due to data corruption in disk or RAM failures and other hardware and software problems that can corrupt data.

Figure 12:
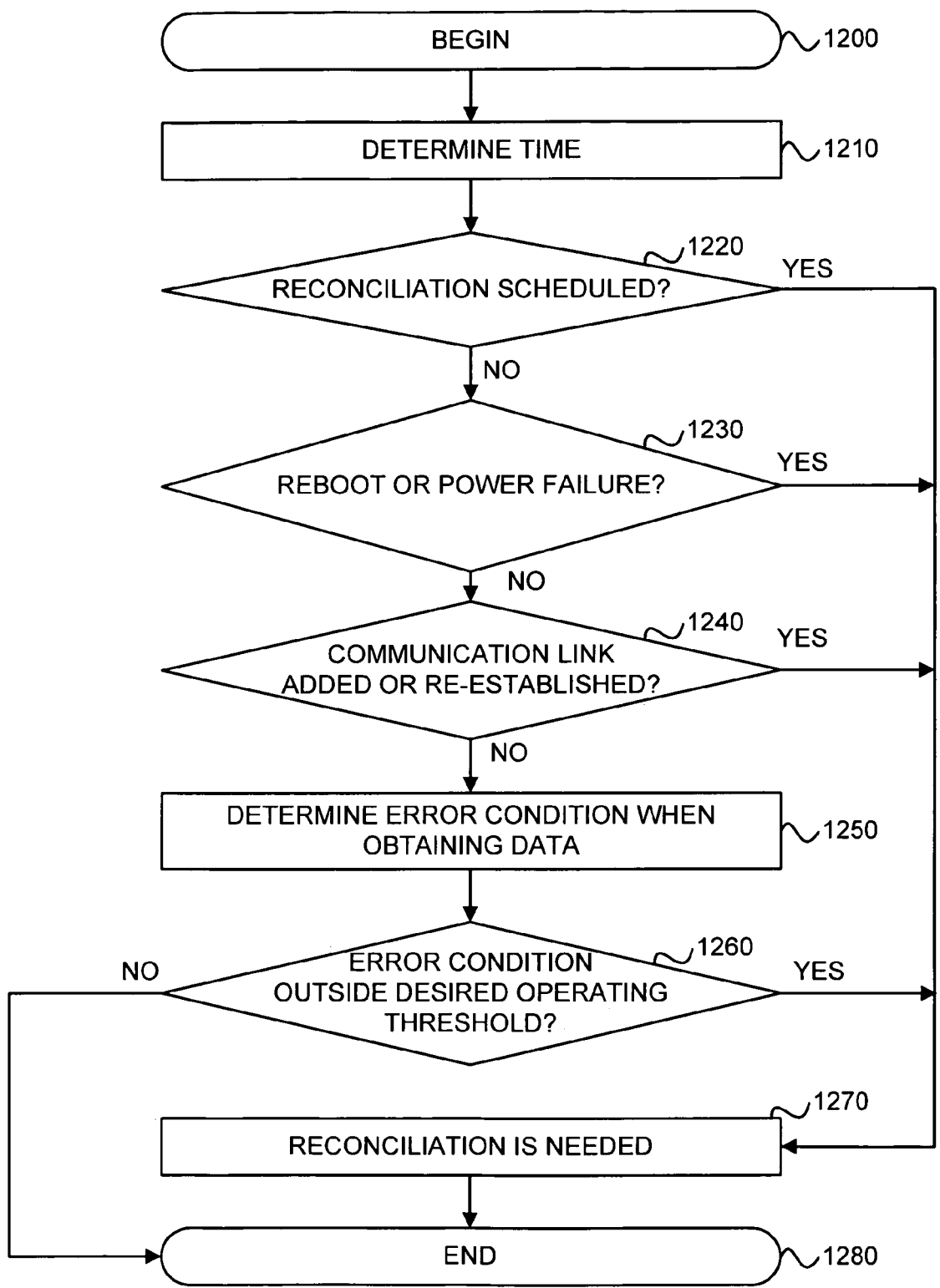
FIG. 12 is a flowchart for determining whether reconciliation is needed of peer state information between a first appliance and a second appliance, in an exemplary implementation of the invention.

FIG. 12 is a flowchart for determining whether reconciliation is needed of peer state information between the first NMA 1020 and the second NMA 1050, in an exemplary implementation of the invention. FIG. 12 begins in step 1200. In step 1210, the first NMA 1020 determines what the time is. In one example, the first NMA 1020 determines a current date and time. In another example, the first NMA 1020 determines an elapsed time since the last discovery and reconciliation. In step 1220, the first NMA 1020 determines whether reconciliation is needed based on the time. If reconciliation is scheduled at the particular date and time, or sufficient time has elapsed since the previous reconciliation, the first NMA 1020 determines that reconciliation is needed in step 1270.

In step 1230, the first NMA 1020 determines whether the first NMA 1020 performed a reboot or suffered a power failure. During a period of inaccessibility of the first NMA 1020 during the reboot or power failure, the status of data in the network memory may change. If the first NMA 1020 performed a reboot or suffered a power failure, then reconciliation is needed to update the status of the data in the local peer state information in step 1270.

In step 1240, the first NMA 1020 determines whether a communication link (e.g., an IPsec tunnel) has been added or re-established with another NMA (e.g., the second NMA 1050). In one example, the communication link between the first NMA 1020 and the second NMA 1050 goes down. The status of data in the network memory can change during the time that the communication link is down. Alternatively, a new communication link is brought up between the first NMA 1020 and a new network memory appliance added to the network memory. If the first NMA 1020 determines a communication link has been added or re-established, reconciliation is needed in step 1270.

In step 1250, the first NMA 1020 determines an error condition when obtaining data from the network memory. An error condition results when an operation performed by a network memory appliance (e.g., the first NMA 1020) to store, retrieve, or otherwise access data in the network memory fails. For example, the first NMA 1020 receives a retrieve instruction (FIG. 7) from the second NMA 1050. While performing the retrieve instruction, the first NMA 1020 determines that the data retrieved from the network memory is corrupted. In another example, the first NMA 1020 may determine an error condition if there is one or more accesses to the network memory resulting in invalid or nonexistent data. In other examples, the data may be corrupt because of an incorrect, invalid, or unknown index in the retrieve instruction, actual errors in the data, or the data may be temporarily unavailable for retrieval from locally accessible storage.

In step 1260, if the error condition of the data is outside a desired operating threshold, such as a higher than average number of failed retrieve instructions, the first NMA 1020 determines reconciliation is needed in step 1270. The first NMA 1020 may not perform discovery and reconciliation operations if the error condition of the data is not outside the desired operating threshold in step 1260. The first NMA 1020 may continue to repeat the process to determine whether reconciliation of the data is needed in step 1210. FIG. 12 ends in step 1280.

The first NMA 1020 of the network memory system 1000 continuously or periodically discovers remote peer state information from the second NMA 1050 and one or more other network memory appliances (e.g., the third NMA 1070) of the network memory system 1000. Each NMA of the network memory system 1000 can take advantage of up-to-date local peer state information when obtaining data from the network memory. The network memory system 1000 reduces network traffic by avoiding or limiting transfers of the data to network memory appliances to which the data is locally accessible. Furthermore, by reconciling peer state information, the network memory system 1000 ensures data integrity by allowing network memory appliances to remove and/or update corrupt or missing data in the network memory without wasting available bandwidth.

Figure 13:
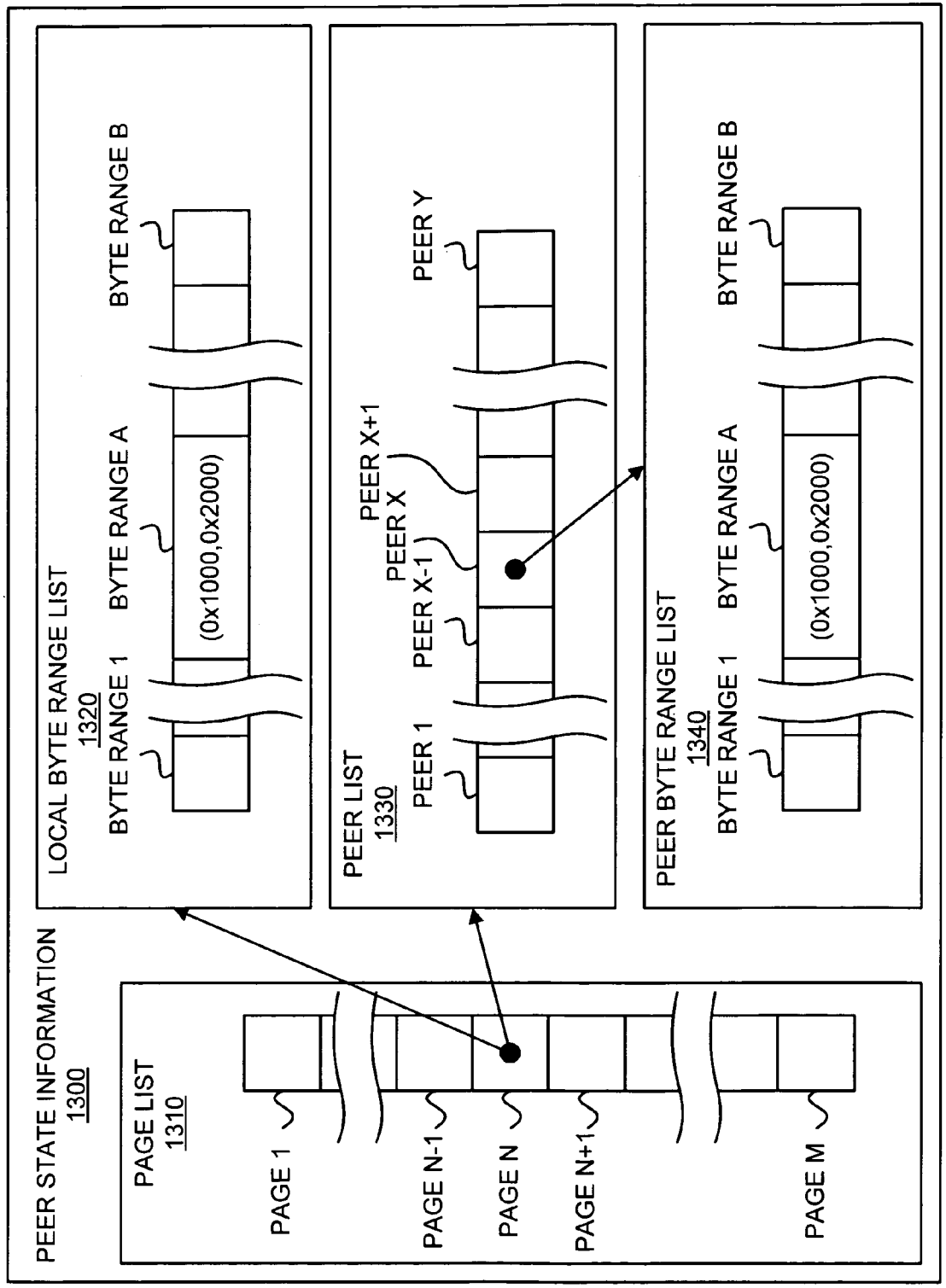
FIG. 13 is an illustration of data structures for the peer state information in the network memory system, in an exemplary implementation of the invention.

FIG. 13 is an illustration of data structures for peer state information 1300 in the network memory system 1000, in an exemplary implementation of the invention. In general, NMAs or peers in the network memory system 1000 include a copy of the data structures for the peer state information 1300. Each peer has its own "view" of data in the network memory depending on the information stored in the peer's data structures for the peer state information 1300. Each peer "discovers" the views of other peers of the network memory system 1000 to ensure data integrity. Discovery is any process, operation, or step to determine the "peer state information" in another peer.

"Peer state information" is any data structure, hierarchy, or combination of information that tracks data (e.g., status, location, address, and validity). For example, peer state information may include identifiers for appliances (aka peers or nodes) that are active in the network memory and indicate whether the active appliances have originated data (e.g., written data to a page data structure of the network memory). The peer state information may indicate the status of data in pages (e.g., tracked or monitored pages, FHPs 545) and/or in byte ranges of the pages in the network memory.

In this example, the peer state information 1300 includes a page list 1310, at least one local byte range list 1320, at least one peer list 1330, and at least one peer byte range list 1340. The page list 1310 is any list, array, or data structure that represents pages (e.g., pages 1 to M of the FHPs 545 in FIG. 5), memory blocks, or segments in a network memory. A page (e.g., page N) in the page list 1310 may be active or inactive. Each active page in the page list 1310 points to a local byte range list 1320 and a peer list 1330. The local byte range list 1320 is any list, array, or data structure that represents byte ranges in the associated page for the local peer (i.e., the peer maintaining the local copy of the peer state information 1300 data structures). For example, for the first NMA 1020 that knows about page N, the local byte range list 1320 includes a list of byte ranges (e.g., byte range "A" from 0x1000 to 0x2000) of content or data stored at the listed byte ranges in the page N.

The peer list 1330 is any list, array, or data structure that represents nodes or peers that know about an associated page in the page list 1310. For example, the first NMA 1020 (FIG. 10) knows about page N if the first NMA 1020 originated or stored data in page N. The first NMA 1020 may also know about page N through discovery and reconciliation operations. Each node or peer in the peer list 1330 that knows about the associated page points to a peer byte range list 1340. The peer byte range list 1340 is any list, array, or data structure that represents byte ranges in the associated page for an associated peer.

To facilitate discovery and reconciliation operations between peer state information in active peers (or nodes) in the network memory, the peers may generate summaries of the peer state information 1300 data structures for exchange over the WAN (e.g., the communications network 330). In some embodiments, particular portions of the summaries are exchanged at different intervals. Alternatively, the summaries may be exchanged at the same time. In one example, the first NMA 1020 generates a node identifier (ID) bitmap from the peer state information 1300 representing which peers the second NMA 1020 knows are active or that have originated data (e.g., stored data in a page in the network memory). The second NMA 1020 also generates for each active peer a page bitmap from the peer state information 1300 representing pages originated by or known to the peer.

Figure 14A:
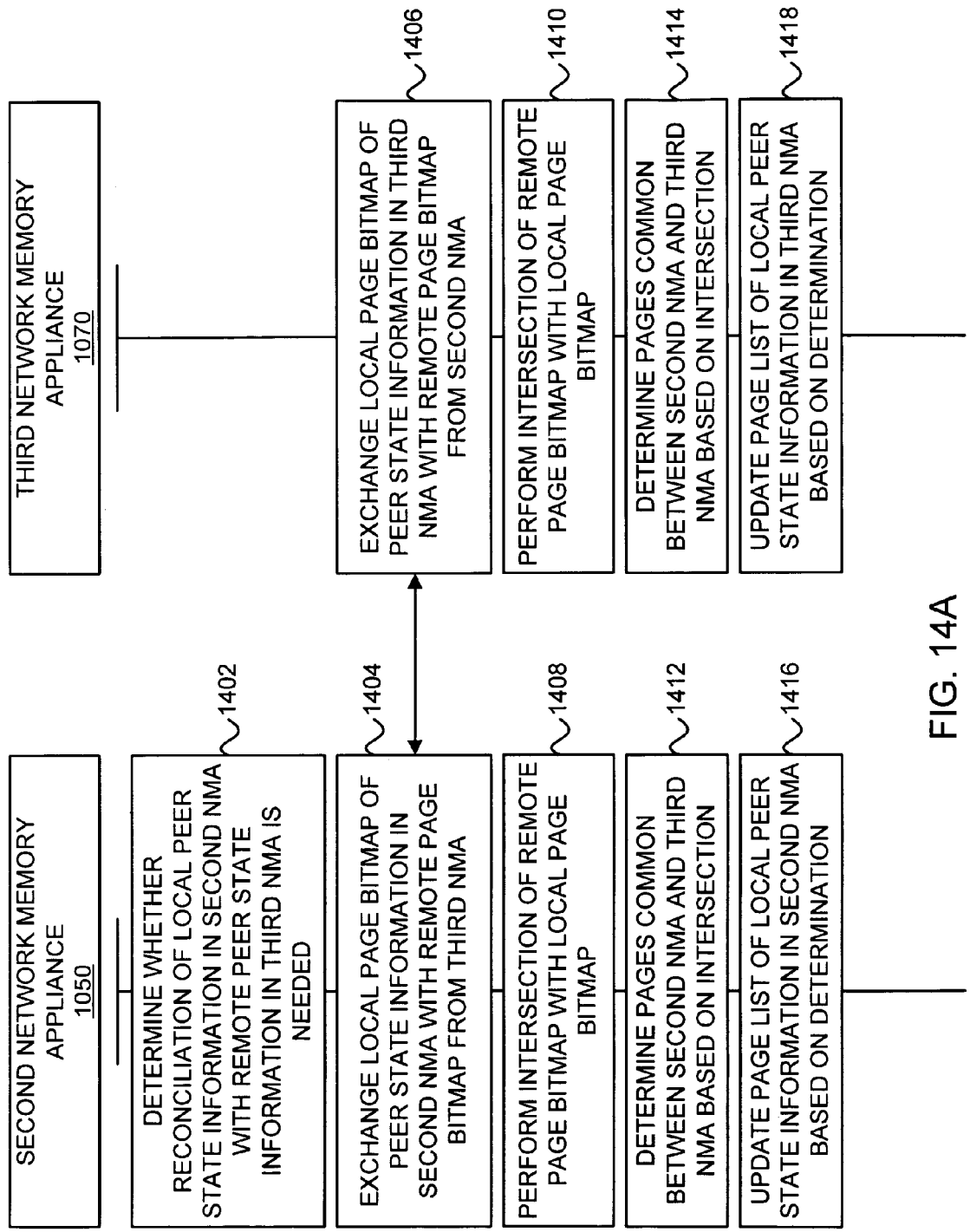
FIG. 14A and FIG. 14B are a message sequence chart for the network memory system for discovery and reconciliation operations between the first appliance and the second appliance, in an exemplary implementation of the invention.
Figure 14B:
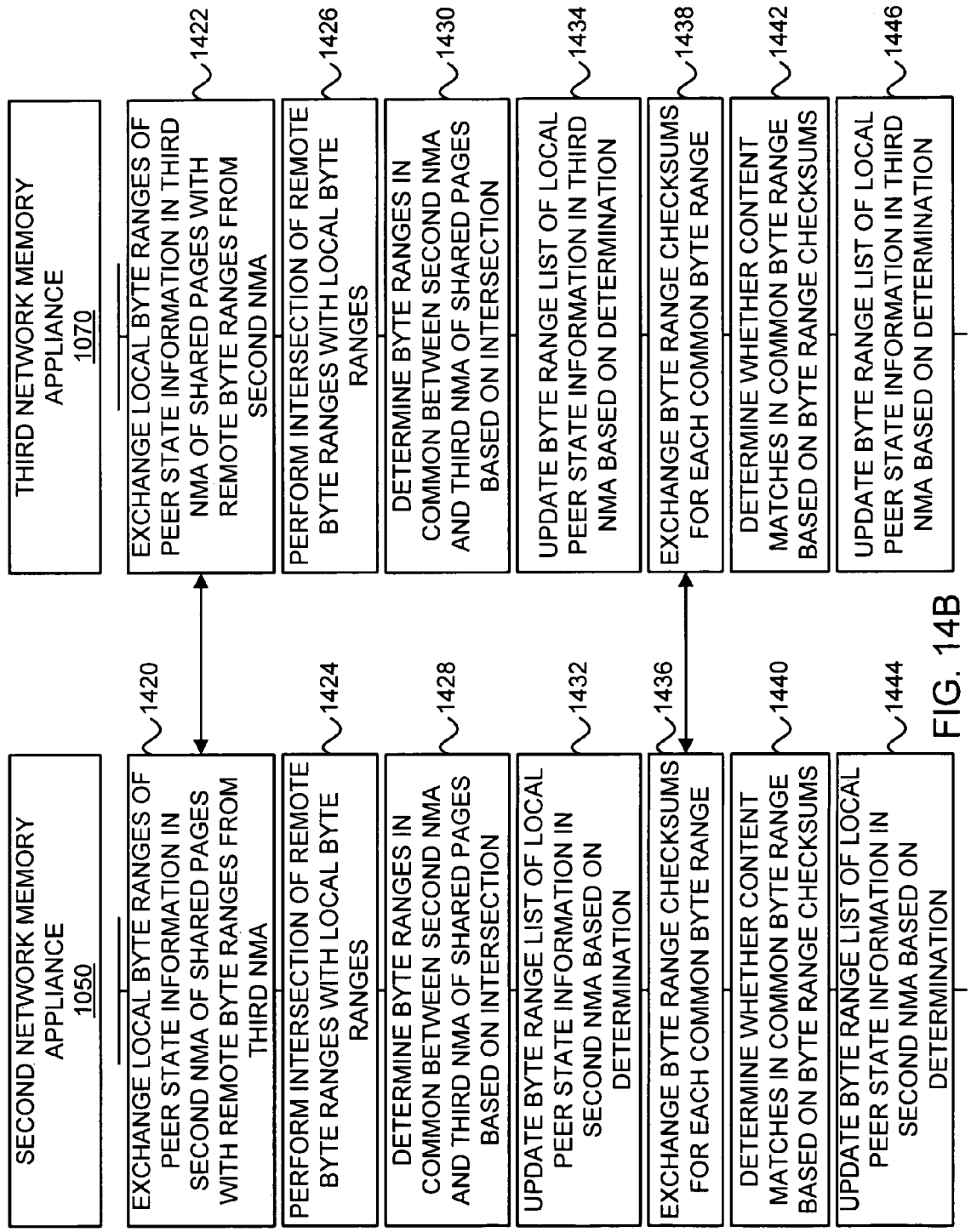

FIG. 14A and FIG. 14B are a message sequence chart for the network memory system 1000 with discovery and reconciliation operations between the second NMA 1050 and the third NMA 1070, in an exemplary implementation of the invention. In sequence 1402, the second NMA 1050 determines whether reconciliation of local peer state information in the second NMA 1050 (i.e., peer state information 1300 data structures) with remote peer state information in the third NMA 1070 (i.e., peer state information 1300 data structures) is needed (see FIG. 12).

In general, the second NMA 1050 determines for each active node the set of pages allocated to, used, or known by the active node. For example, the second NMA 1050 determines from the remote peer state information in the third NMA 1070 whether the third NMA 1070 is an active node. The second NMA 1050 also determines one or more pages of the network memory allocated to or used by the third NMA 1070. The second NMA 1050 then determines whether the second NMA 1050 and the third NMA 1070 share, have in common, or access the same pages of the network memory.

For finer grained reconciliation, the second NMA 1050 can further determine for each page in common or shared with the active node whether the second NMA 1050 and the active node share, have in common, or access the same byte ranges in each common page. Continuing the previous example, for each page in common with the third NMA 1070, the second NMA 1050 determines common byte ranges in each common page. The second NMA 1050 may also determine whether the contents of common byte ranges match by exchanging byte range checksums with the third NMA 1070 for each common byte range. The second NMA 1050 reconciles or updates the local peer state information in the second NMA 1050 for the one or more pages and the byte ranges for any data that is locally accessible to both the second NMA 1050 and the third NMA 1070.

The third NMA 1070 performs similar discovery and reconciliation operations with other active nodes (e.g., the second NMA 1050). For example, the third NMA 1070 determines from the remote peer state information in the second NMA 1050 one or more pages of the network memory in common with the second NMA 1050. The third NMA 1070 further determines common byte ranges of the one or more pages. The third NMA 1070 reconciles or updates the local peer state information in the third NMA 1070 for the one or more pages and the byte ranges for any data that is locally accessible to both the second NMA 1050 and the third NMA 1070.

Referring again to FIG. 14A, in sequence 1404, the second NMA 1050 exchanges a local page bitmap of the peer state information in the second NMA 1050 with a remote page bitmap from the third NMA 1070. In sequence 1406, the third NMA 1070 exchanges a local page bitmap of the peer state information in the third NMA 1070 with a remote page bitmap from the second NMA 1050. In sequence 1408, the second NMA 1050 performs an intersection of the remote page bitmap with the local page bitmap in the second NMA 1050. In sequence 1410, the third NMA 1070 performs an intersection of the remote page bitmap with the local page bitmap in the third NMA 1070.

In sequence 1412, the second NMA 1050 determines pages in common or shared between the second NMA 1050 and the third NMA 1070 based on the intersection. For example, if the remote page bitmap and the local page bitmap each indicate a set bit for a particular page, the second NMA 1050 and the third NMA 1070 both have data on the particular page. In sequence 1414, the third NMA 1070 determines pages in common or shared between the second NMA 1050 and the third NMA 1070 based on the intersection. In sequence 1416, the second NMA 1050 updates the page list (e.g., the page list 1310) of the local peer state information in the second NMA 1050 based on the determination. For example, if a set bit status in the local page bitmap for a given page does not agree with an unset bit status in the remote page bitmap, the second NMA 1050 removes the relationship for the given page from the local page bitmap (e.g., sets the given page as inactive). In sequence 1418, the third NMA 1070 updates the page list of the local peer state information in the third NMA 1070 based on the determination.

In sequence 1420, the second NMA 1050 exchanges local byte ranges of the peer state information in the second NMA 1050 of the in common or shared pages with remote byte ranges from the third NMA 1070. In sequence 1422, the third NMA 1070 exchanges local byte ranges of the peer state information in the third NMA 1070 of the in common or shared pages with remote byte ranges from the second NMA 1050. In sequence 1424, the second NMA 1050 performs an intersection of the remote byte ranges with the local byte ranges of the peer state information in the second NMA 1050 of the pages in common or shared between the second NMA 1050 and the third NMA 1070. In sequence 1426, the third NMA 1070 performs an intersection of the remote byte ranges with the local byte ranges of the peer state information in the third NMA 1070 of the pages in common or shared between the second NMA 1050 and the third NMA 1070.

In sequence 1428, the second NMA 1050 determines byte ranges in common or shared between the second NMA 1050 and the third NMA 1070 based on the intersection. In sequence 1430, the third NMA 1070 determines byte ranges in common or shared between the third NMA 1070 and the second NMA 1050 based on the intersection. In sequence 1432, the second NMA 1050 updates the byte range list (e.g., the local byte range list 1320 and the peer byte range list 1340) of the peer state information in the second NMA 1050 based on the determination. For example, the second NMA 1050 may add common byte ranges and/or remove byte ranges not shared from a given common page. In sequence 1434, the third NMA 1070 updates the byte range list of the peer state information in the third NMA 1070 based on the determination.

Additionally, the second NMA 1050 and the third NMA 1070 may determine whether contents of byte ranges in common or shared in a given page match by exchanging a "checksum" for each of the byte ranges of the given page. A checksum is any value, hash, and/or cyclical redundancy check (CRC) that represents contents of or data stored in a given byte range. In one example, a page checksum is calculated for a given byte or byte range of the page, by sequentially combining all the bytes of data in the byte range with a series of arithmetic or logical operations.

In sequence 1436, the second NMA 1050 exchanges byte range checksums with the third NMA 1070 for each common or shared byte range between the second NMA 1050 and the third NMA 1070. In sequence 1438, the third NMA 1070 exchanges byte range checksums for each common or shared byte range between the second NMA 1050 and the third NMA 1070. In sequence 1440, the second NMA 1050 determines whether the content of each byte range in common or shared between the second NMA 1050 and the third NMA 1070 matches based on the byte range checksum. In sequence 1442, the third NMA 1070 determines whether the content of each byte range in common or shared between the third NMA 1070 and the second NMA 1050 matches based on the byte range checksum. In sequence 1444, the second NMA 1050 updates the byte range list of the local peer state information in the second NMA 1050 based on the determination. In sequence 1446, the third NMA 1070 updates the byte range list of the local peer state information in the third NMA 1070 based on the determination.

In some embodiments, the second NMA 1050 and the third NMA 1070 may exchange only a portion of the peer state information in each network memory appliance. For example, the second NMA 1050 and the third NMA 1070 may break up local peer state information into a hierarchy of node ID bitmaps, page bitmaps, and byte ranges. The node ID bitmap represents active nodes in the network memory. For each active node, the second NMA 1050 generates a page bitmap representing pages allocated to, used by, or known to the active node. For each page of the active node, the second NMA 1050 generates a list of byte ranges for the contents or data stored in the page. The second NMA 1050 and the third NMA 1070 may exchanges the node ID bitmaps, pages bitmaps, and byte ranges separately or when requested or needed.

In another example, the second NMA 1050 may determine to reconcile the data in the network memory every minute. Rather than transfer the entire local peer state information hierarchy every minute, the second NMA 1050 sends node ID bitmap, page bitmap, and/or page range deltas. In other words, the second NMA 1050 transfers only the changes that have occurred over a period of time or since the previous discovery and reconciliation. If an active node does not have any data or contents in any allocated or known pages, the second NMA 1050 may determine not to generate and exchange bitmaps for the active node. The second NMA 1050 may also transfer the entire local peer state information, for example, every hour or during particular times of the day. In further embodiments, the second NMA 1050 exchanges a list of suspect pages and prioritizes page and/or byte range checksum comparison for the suspect pages.

Figure 15A:
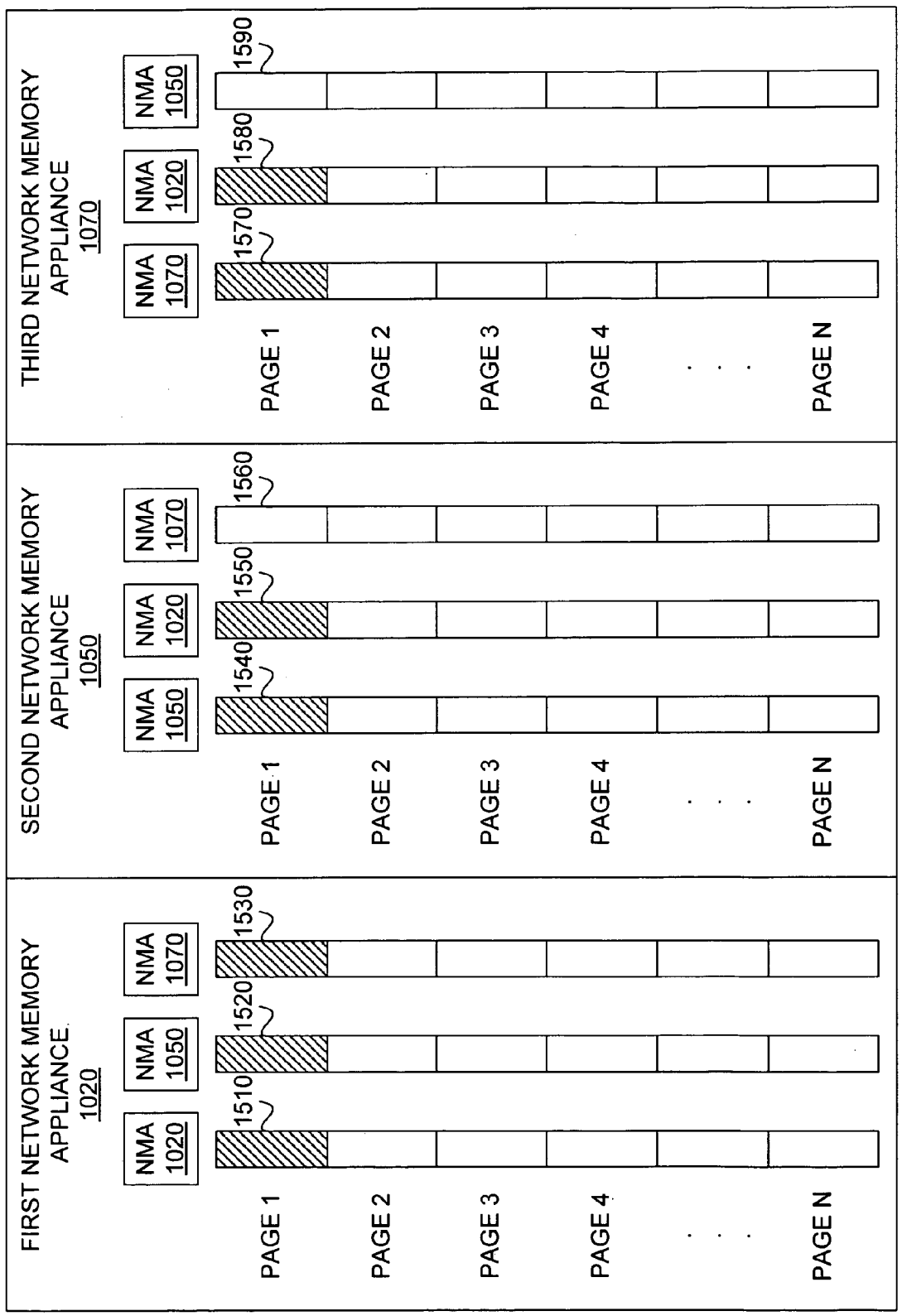
FIG. 15A is an illustration of data structures for the network memory system before page discovery and reconciliation operations, in an exemplary implementation of the invention.

FIG. 15A is an illustration of data structures for the network memory system 1000 before page discovery and reconciliation operations, in an exemplary implementation of the invention. Blocks 1510-1590 represent data structures (e.g., a bit in the page bitmap of the peer state information 1300) that track the status (e.g., the presence) of data in page #1 of the network memory. Each marked block indicates that the data in the respective page (e.g., page #1) is locally accessible to a network memory appliance. For example, block 1510 indicates that data is present in page #1 of the network memory and locally accessible to the first NMA 1020. The marked block 1520 indicates that the data in page #1 is locally accessible to the second NMA 1050. The marked block 1530 indicates that the data in page #1 is locally accessible to the third NMA 1070.

In this example, just before the discovery and reconciliation operations, blocks 1510, 1520, and 1530 are marked. In the second NMA 1050, blocks 1540 and 1550 are marked, and block 1560 for the third NMA 1070 is unmarked. In the third NMA 1070, blocks 1570 and 1580 are marked, and block 1590 for the second NMA 1050 is unmarked. The first NMA 1020, the second NMA 1050, and the third NMA 1070 perform discovery and reconciliation operations to update the status of data locally accessible to each NMA in the blocks 1510-1590.

Figure 15B:
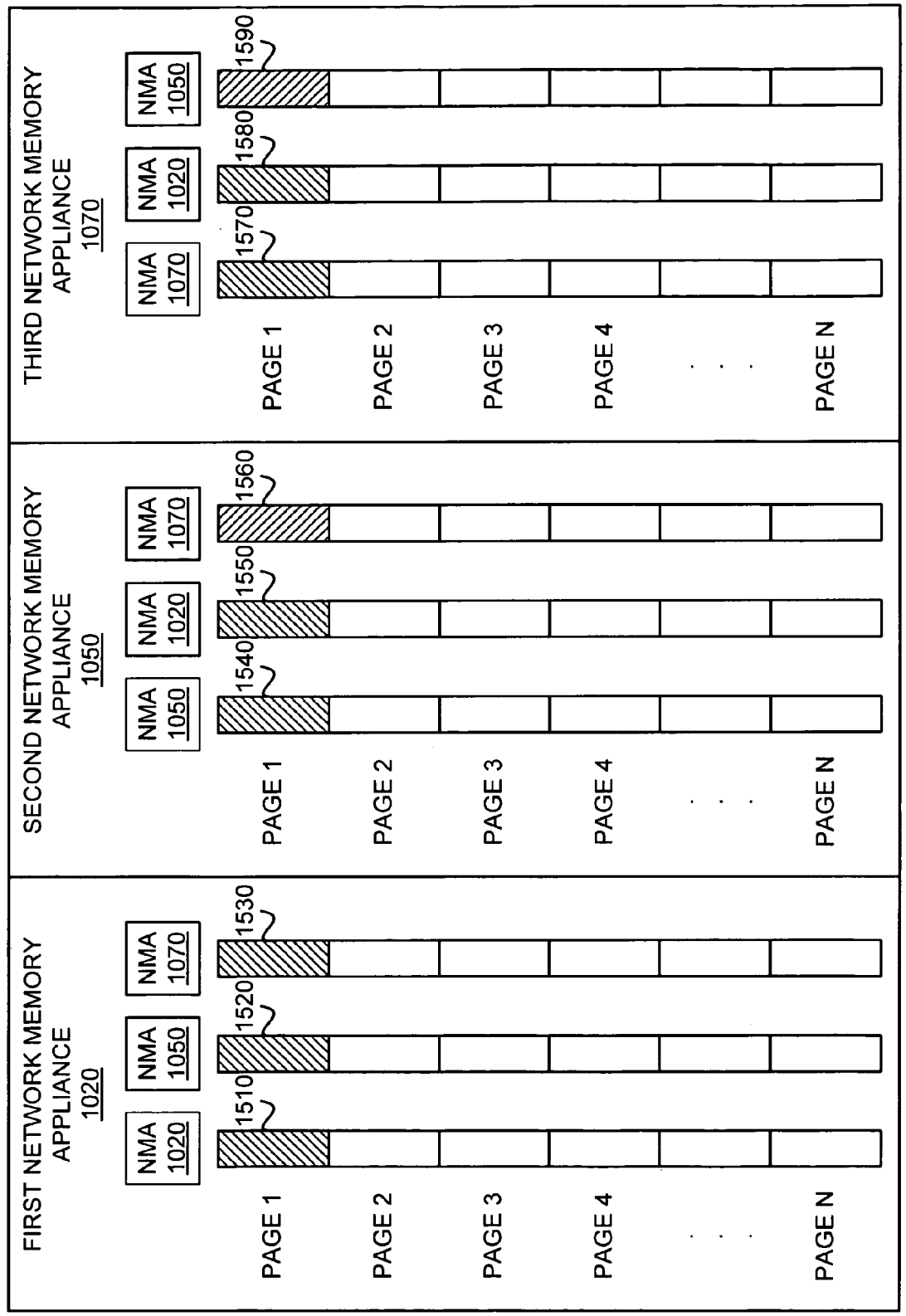
FIG. 15B is an illustration of the data structures for the network memory system after page discovery and reconciliation operations between a first appliance and a second appliance, in an exemplary implementation of the invention.

FIG. 15B is an illustration of the data structures for the network memory system 1000 after page discovery and reconciliation operations between the second NMA 1050 and the third NMA 1070, in an exemplary implementation of the invention. In particular, the block 1560 is marked to indicate to the second NMA 1050 that the data in page #1 is locally accessible to the third NMA 1070. The second NMA 1050 discovers from the third NMA 1070 that the data in page #1 is locally accessible to the third NMA 1070. The second NMA 1050 reconciles the local peer state information (e.g., the block 1560) with the remote peer state information discovered from the third NMA 1070 (e.g., the block 1570). Additionally, the block 1590 is marked to indicate to the third NMA 1070 that the data in page #1 is locally accessible to the second NMA 1050. The network memory system 1000 periodically or continuously updates the blocks 1510-1590 to indicate whether the data in page #1 is locally accessible to the first NMA 1020, the second NMA 1050, and the third NMA 1070. The first NMA 1020, the second NMA 1050, and the third NMA 1070 can take advantage of knowing that the data in page #1 is locally accessible to a particular NMA and avoid or limit retransmission of the data to another NMA.

Figure 16A:
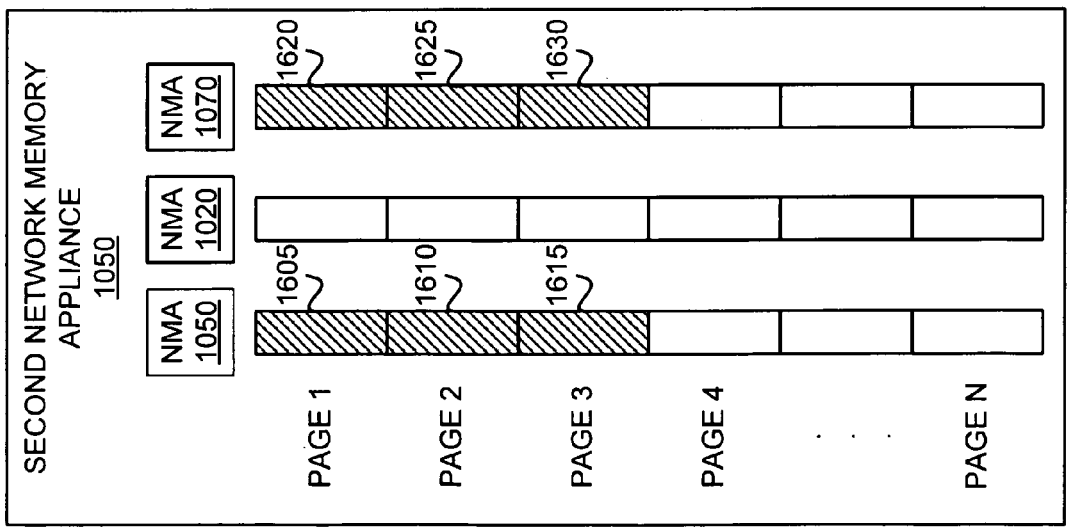
FIG. 16A is an illustration of data structures for the network memory system before page and byte range discovery and reconciliation operations, in an exemplary implementation of the invention.
Figure 16A:
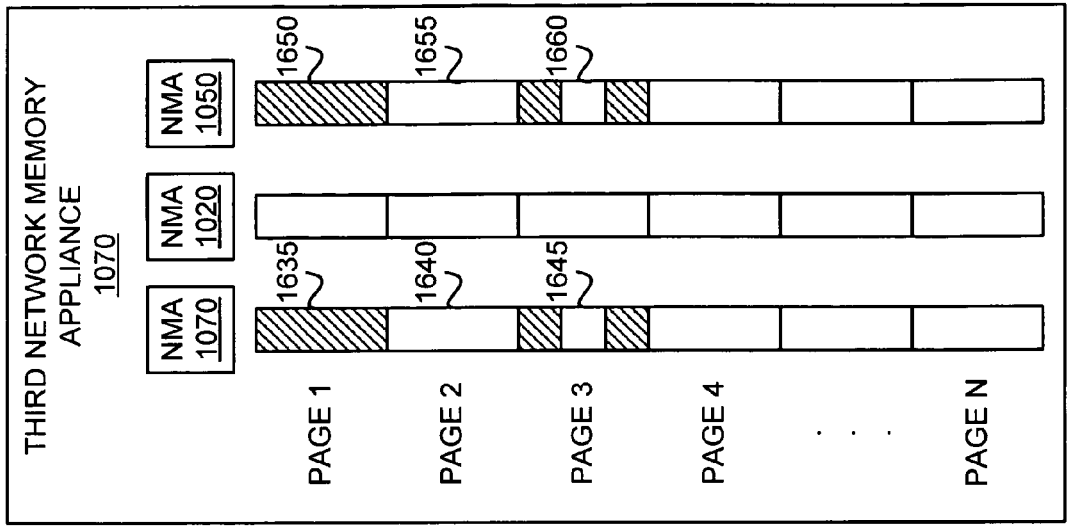

FIG. 16A is an illustration of data structures for the network memory system 1000 before page and byte range discovery and reconciliation operations, in an exemplary implementation of the invention. Just before discovery and reconciliation, blocks 1605, 1610, and 1615 are marked for data in pages #1, 2, and 3 that is locally accessible to the second NMA 1050. Blocks 1620, 1625, and 1630 are marked indicating that the data in pages #1, 2, and 3 is locally accessible to the third NMA 1070. However, due to transmission errors for instance, the third NMA 1070 does not contain all of the data.

In this example, block 1635 is marked for a portion of the data stored in page #1 that is locally accessible to the third NMA 1070. Block 1640 is unmarked because either the third NMA 1070 did not receive a portion of the data or the portion was corrupted in page #2, so the third NMA 1070 does not store the portion of the data in the network memory in page #2. Additionally, the third NMA 1070 stores only a portion of the data (a first range and a second range) in the network memory in page #3. The block 1645 is completely unmarked or partially marked as shown to indicate that only a portion of the data in page #3 is locally accessible.

Blocks 1650, 1655, and 1660 are marked the same as blocks 1635, 1640, and 1645, respectively, to indicate the status of data locally accessible to the second NMA 1050 as known by the third NMA 1070. For example, due to the transmission errors, the third NMA 1070 only knows that the portion of the data (the first range and the second range) send from the second NMA 1050 in the network memory in page #3 is locally accessible to the second NMA 1050. The block 1660 may be completely unmarked or partially marked as shown to indicate that only the portion of the data in page #3 is locally accessible to the second NMA.

Figure 16B:
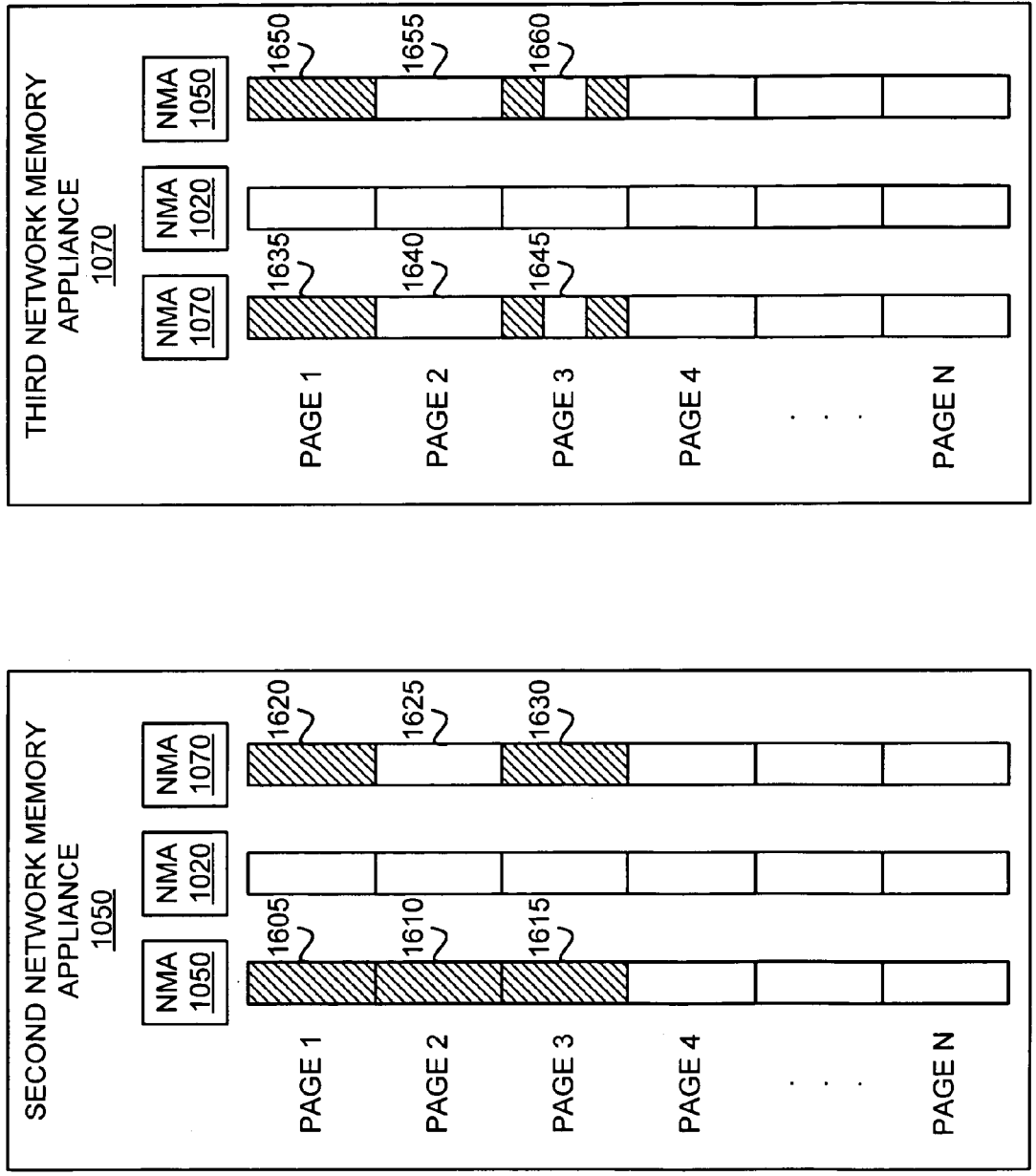
FIG. 16B is an illustration of the data structures for the network memory system after page discovery and reconciliation operations between a first appliance and a second appliance, in an exemplary implementation of the invention.

FIG. 16B is an illustration of the data structures for the network memory system 1000 after page discovery and reconciliation operations between the second NMA 1050 and the third NMA 1070, in an exemplary implementation of the invention. After discovery and reconciliation operations, block 1625 for the third NMA 1070 is unmarked indicating to the second NMA 1050 that the portion of the data in page #2 is not locally accessible to the third NMA 1070.

Figure 16C:
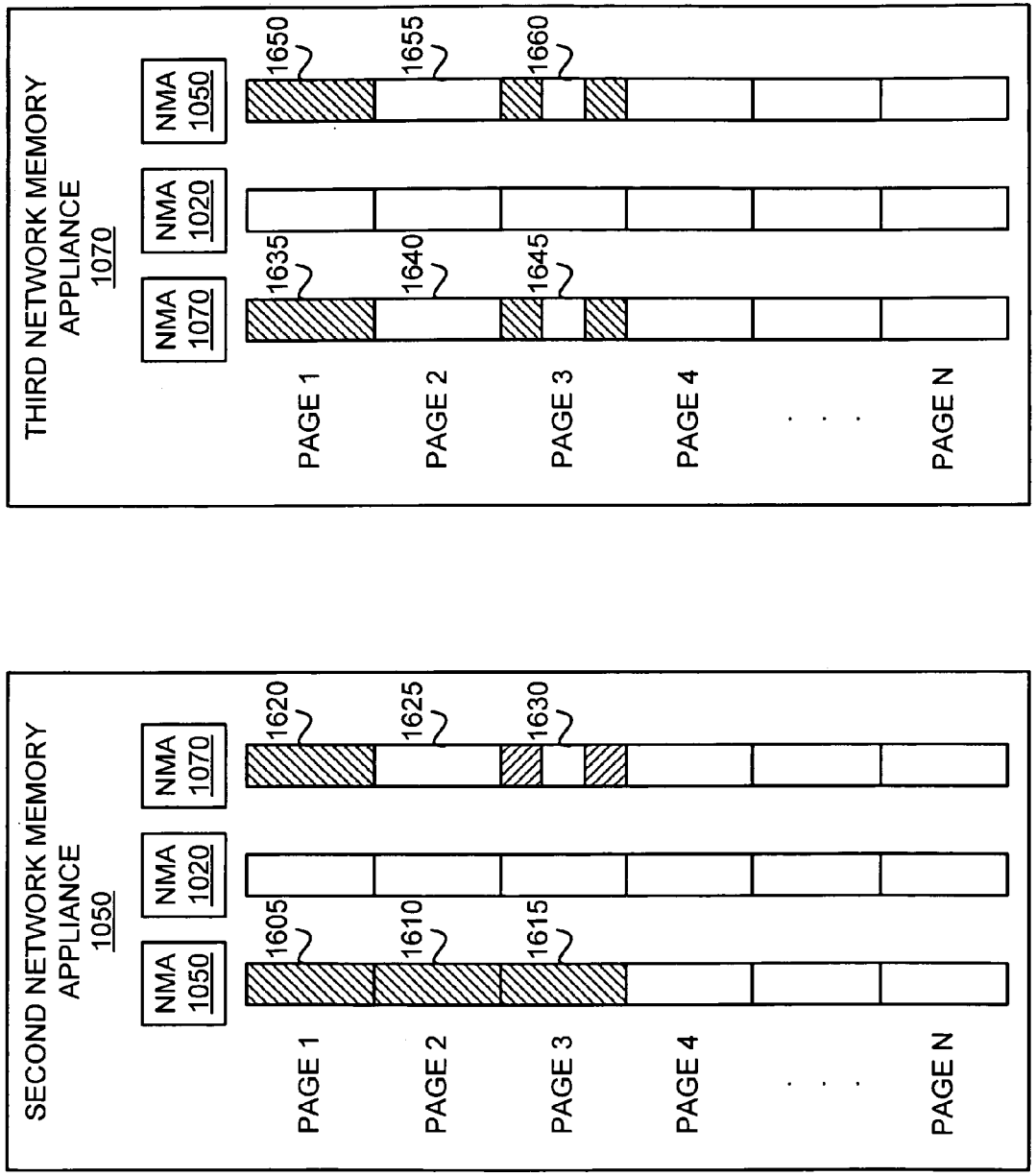
FIG. 16C is an illustration of the data structures for the network memory system after byte range discovery and reconciliation operations between a first appliance and a second appliance, in an exemplary implementation of the invention.

FIG. 16C is an illustration of the data structures for the network memory system 1000 after byte range discovery and reconciliation operations between the second NMA 1050 and the third NMA 1070, in an exemplary implementation of the invention. The third NMA 1070 stores the first portion and the second portion of the data in the network memory in page #3 (represented by the two shaded portions of block 1645). The second NMA 1050 partially marks the block 1630 (represented by the two shaded portions of the block 1630) with the page ranges of the first portion and the second portion of the data stored in page #3 in the third NMA 1050.

By maintaining peer state information in the first NMA 1020, the second NMA 1050, and the third NMA 1070, the network memory system 1000 ensures data integrity by continuous or periodic discovery of the status of the data in the network memory, such as new data added by other peers and the removal of stale data. Reconciliation provides each peer an up-to-date status of data locally accessible to the peer and data in the network memory locally accessible to other peers of the network memory system 1000. Additionally, since the peer state information or peer state information deltas are transferred between the peers of the network memory, the network memory system 1000 ensures data integrity without bandwidth intensive data backups and synchronizations.

Figure 17A:
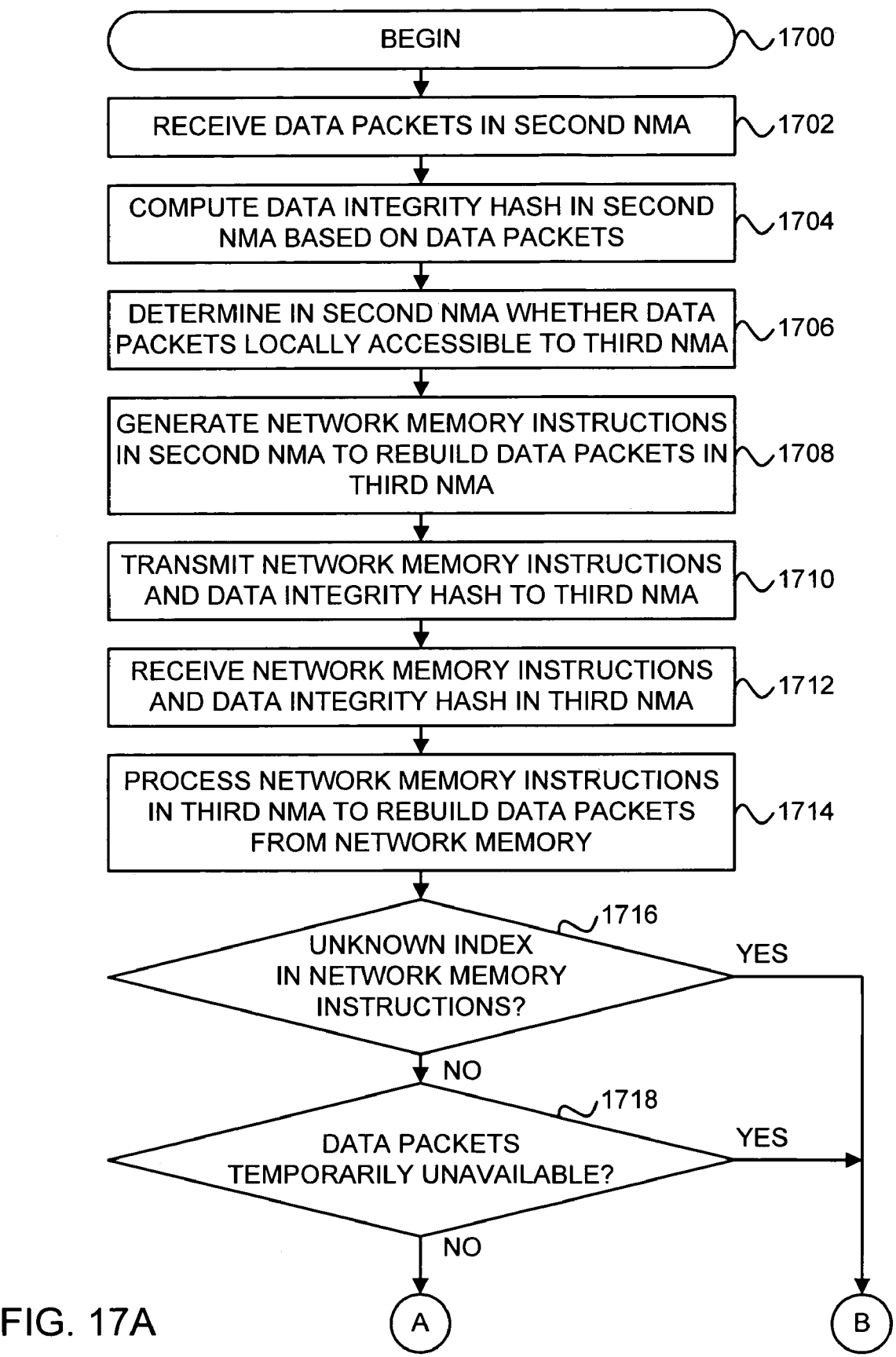
FIG. 17A and FIG. 17B are a flowchart for the network memory system for discovery and reconciliation operations based on an error condition, in an exemplary implementation of the invention.
Figure 17B:
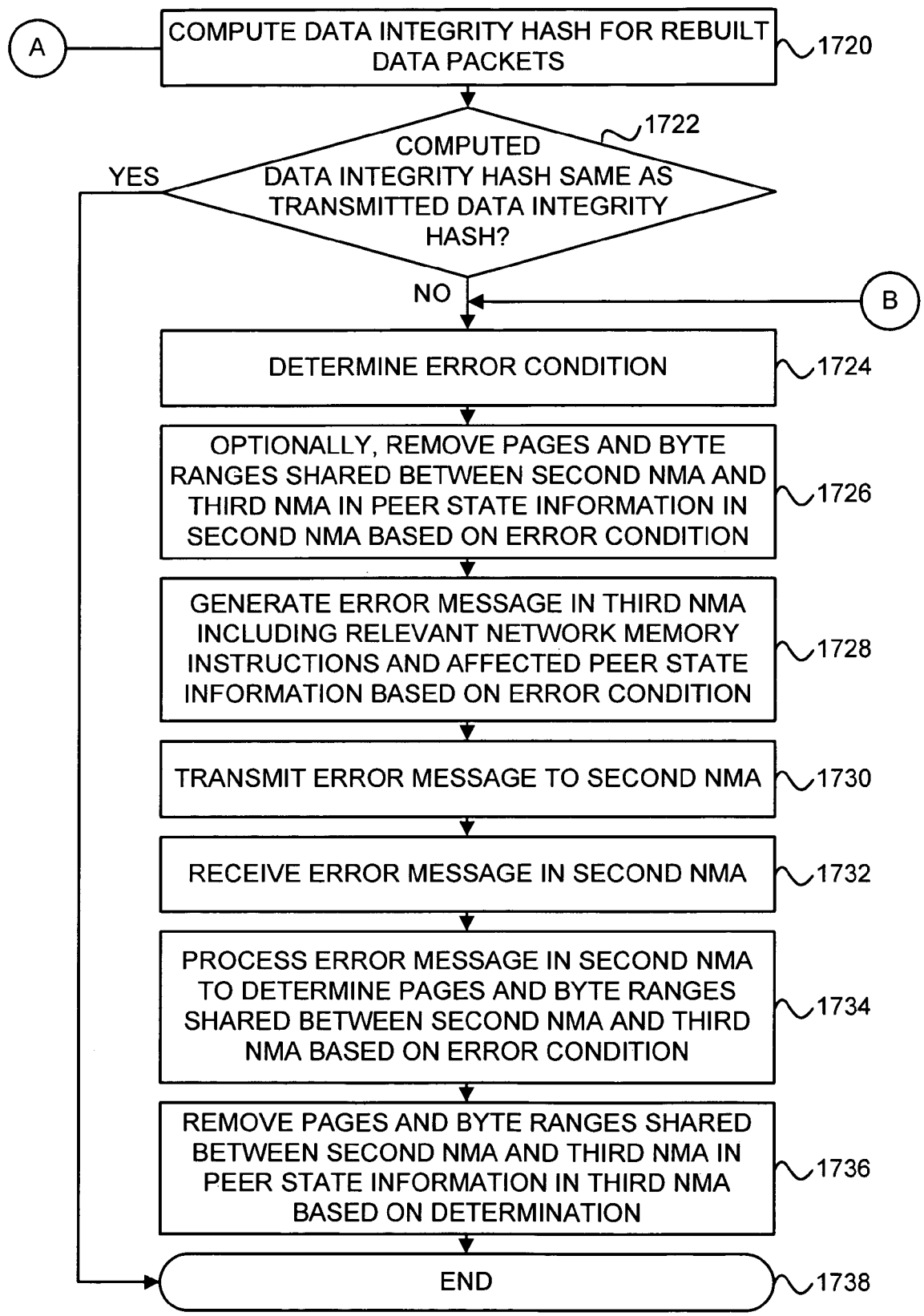

FIG. 17A and FIG. 17B are a flowchart for discovery and reconciliation based on an error condition in the network memory system 1000, in an exemplary implementation of the invention. FIG. 17A begins in step 1700. In step 1702, the second NMA 1050 receives data packets (e.g., from the computer 1040). In this example, the computer 1040 addresses the data packets to the server 1080 (see FIGS. 10-11).

In step 1704, the second NMA 1050 computes a data integrity hash based on the data packets. A data integrity hash is any value, hash, and/or CRC that uniquely or semi-uniquely represents data (e.g., the data packets). In step 1706, the second NMA 1050 determines whether the data packets are locally accessible to the third NMA 1070. For example, the second NMA 1050 processes the data packets to strip packet headers and compute secure hashes (see FIG. 5) to determine whether the second NMA 1050 already transmitted the data packets to the third NMA 1070. In this example, through discovery and reconciliation operations (see FIGS. 10-11 and 14A-14B), the peer state information in the second NMA 1050 indicates that the data packets are locally accessible to the third NMA 1070.

In step 1708, the second NMA 1050 generates network memory instructions (e.g., one or more retrieve instructions) to rebuild the data packets in the third NMA 1070 from the network memory locally accessible to the third NMA 1070. In step 1710, the second NMA 1050 transmits the network memory instructions and the data integrity hash to the third NMA 1070. In step 1712, the third NMA 1070 receives the network memory instructions and the data integrity hash.

In step 1714, the third NMA 1070 processes the network memory instructions to rebuild the data packets from the network memory. For example, the network memory instructions may include one or more indexes for the data packets. The one or more indexes indicate to the third NMA 1070 to retrieve the data packets from a database locally accessible to the third NMA 1070. In step 1716, the third NMA 1070 determines whether there is an unknown index in the network memory instructions.

For example, one or more of the indexes may provide out-of-bounds references in the database (or the one or more indexes point to unused or invalid portions of the network memory). If all indexes are known or valid, the third NMA 1070 determines whether any of the data packets are temporarily unavailable in step 1718. For example, the data packets may be locally accessible to the third NMA 1070 in the network memory, however, the time to retrieve the data packets (e.g., from a network attached storage vs. from random access memory) or otherwise access the data packets is determined to be prohibitive or does not meet a desired operating threshold.

Referring to FIG. 17B, if all of the data packets are available in step 1718 and there are no unknown indexes in step 1716, the third NMA 1070 computes a data integrity hash for the rebuilt or retrieved data packets in step 1720. In step 1722, the third NMA 1070 determines whether the computed data integrity hash is the same or matches the data integrity hash transmitted with the network memory instructions. If the computed data integrity hash matches the transmitted data integrity hash, the third NMA 1070 properly rebuilt or retrieved the data packets from the network memory.

However, if the computed data integrity hash and the transmitted data integrity hash do not match, or if there are unknown indexes in the network memory instruction in step 1716, or if any of the data packets are temporarily unavailable in step 1718, the third NMA 1070 determines an error condition in step 1724. Some examples of error conditions are lost packets, out of order packets (e.g., implicit store across multiple packets results in misplaced blocks of data), corrupt bits in packet payload (e.g., store wrong/corrupted data in the right place or store right data in the wrong place if the instructions were corrupt). Additional examples are the unknown block(s) of data (e.g. unknown block index in retrieve instruction), suspect block(s) of data (e.g. bad packet reconstruction), data temporarily unavailable (e.g., data not in RAM or disk busy), and data permanently unavailable (e.g., data aged out of network memory and subsequently overwritten).

Optionally, in step 1726, the third NMA 1070 updates the local peer state information in the third NMA 1070. The third NMA 1070 removes pages and byte ranges indicated as shared between the second NMA 1050 and the third NMA 1070 based on the error condition. For example, the third NMA 1070 updates the page list, peer lists, and byte range lists for the third NMA 1070 to remove references to the portion of the data which is corrupt or subject to the error condition and which is not locally accessible to the third NMA 1070. Additionally, the third NMA 1070 may also update the page list, peer lists, and byte range lists for the second NMA 1050 in the local peer state information in the third NMA 1070 based on the error condition.

In step 1728, the third NMA 1070 generates an error message to the second NMA 1050 including the relevant network memory instructions and affected peer state information based on the error condition. The error message is any combination of information that signals to the second NMA 1050 that the error condition occurred and allows the second NMA 1050 to update the peer state information in the second NMA 1050 based on the error condition. In one example, the error message includes a reason for the error and an error type. In some embodiments, the third NMA 1070 includes indexes for a corrupt portion of the data. In some embodiments, the error message includes a particular page on which errors were found, a set of valid byte ranges for the particular page, and optionally byte range checksums for the set of valid byte ranges. In step 1730, the third NMA 1070 transmits the error message to the second NMA 1050.

In step 1732, the second NMA 1050 receives the error message. In step 1734, the second NMA 1050 processes the error message to determine pages and byte ranges shared between the second NMA 1050 and the third NMA 1070 based on the error condition in the error message. In step 1736, the second NMA 1050 removes pages and byte ranges from the page list, the peer lists, and the byte range list in the local peer state information in the second NMA 1050 based on the determination. FIG. 17B ends in step 1738.

In some embodiments, the third NMA 1070 determines an error condition when obtaining the data from the network memory based on a protocol mechanism, such as Transmission Control Protocol (TCP) re-transmit. The third NMA 1070 determines an error condition based on receiving a TCP retransmit for an unacknowledged TCP packet. For example, if the third NMA 1070 cannot reconstruct a TCP packet sent from the second NMA 1050 and transfer the TCP packet to an end-point (e.g., the server 680), the second NMA 1050 (or the original source of the TCP packet) may retransmit the TCP packet (the TCP retransmit). Additionally, double TCP retransmits and TCP slow down may be caused after the error condition has been detected. The third NMA 1070 detects the TCP retransmit and may generate an error message to the second NMA 1050 that the TCP packet is not available to the third NMA 1070. The second NMA 1050 then updates its local peer state information accordingly.

The third NMA 1070 may also eliminate second or double TCP retransmit following an error condition through a proactive negative acknowledgement (NACK). The third NMA 1070 generates and transmits an error message to the second NMA 1050 when a hole (i.e., missing blocks of data) is left after a string of store instructions. The second NMA 1050 updates its local peer state information accordingly. When the second TCP retransmit occurs, the second NMA 1050 then may retransmit just the missing blocks of the data to fill the hole.

The network memory system 1000 provides up-to-date data access to data in the network memory through the transparent discovery and reconciliation operations. Therefore, by proactively ensuring data integrity in the network memory, the network memory system 1000 advantageously provides up-to-date data access for increased productivity. The network memory system 1000 also maintains coherency of data send over a WAN that is lost or corrupted by reacting to error conditions when obtaining data from the network memory and performing reconciliation when needed.

The above-described functions can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for ensuring data integrity in network memory, the method comprising:
   determining whether reconciliation between a first peer state information in a first appliance and a second peer state information in a second appliance is needed, the first peer state information and the second peer state information tracking the status of data in the network memory;
   determining an action to reconcile the first peer state information with the second peer state information based on a positive determination that the reconciliation is needed; and
   performing the action to reconcile the first peer state information with the second peer state information.

2. The method of claim 1 wherein the first peer state information and the second peer state information comprise the status of the data in the network memory locally accessible to the first appliance and the status of the data in the network memory locally accessible to the second appliance.

3. The method of claim 1 determining whether reconciliation between the first peer state information and the second peer state information is needed comprises discovery of the first peer state information and discovery of the second peer state information.

4. The method of claim 1 wherein determining whether reconciliation between the first peer state information and the second peer state information is needed comprises determining whether reconciliation is needed based on time.

5. The method of claim 1 wherein determining whether reconciliation between the first peer state information and the second peer state information is needed comprises determining whether reconciliation is needed based on an error condition when obtaining the data from the network memory.

6. The method of claim 5 further comprising generating and transmitting an error message between the first appliance and the second appliance based on the error condition.

7. The method of claim 1 wherein performing the action to reconcile the first peer state information with the second peer state information comprises exchanging the first peer state information in the first appliance with the second peer state information in the second appliance.

8. The method of claim 7 wherein performing the action further comprises updating the status of the data in the first peer state information with the status of the data in the second peer state information.

9. The method of claim 1 wherein performing the action comprises transmitting a range of addresses of the network memory in the first peer state information and in the second peer state information between the first appliance and the second appliance.

10. A first appliance for ensuring data integrity in network memory, the first appliance comprising:
    a communications interface configured to communicate over a communication network with a second appliance of the network memory; and
    a processor configured to determine whether reconciliation between a first peer state information in the first appliance and a second peer state information in the second appliance is needed, the first peer state information and the second peer state information tracking the status of data in the network memory, determine an action to reconcile the first peer state information with the second peer state information based on a positive determination that the reconciliation is needed, and perform the action to reconcile the first peer state information with the second peer state information.

11. The first appliance of claim 10 wherein the first peer state information and the second peer state information comprise the status of the data in the network memory locally accessible to the first appliance and the status of the data in the network memory locally accessible to the second appliance.

12. The first appliance of claim 10 wherein the processor is configured to determine whether reconciliation is needed based on discovery of the first peer state information and discovery of the second peer state information.

13. The first appliance of claim 10 wherein the processor is configured to determine whether reconciliation is needed based on time.

14. The first appliance of claim 10 wherein the processor is configured to determine whether reconciliation is needed based on an error condition when obtaining the data from the network memory.

15. The first appliance of claim 14 wherein the processor is further configured to generate and transmit an error message over the communication network between the first appliance and the second appliance based on the error condition.

16. The first appliance of claim 10 wherein the processor is further configured to exchange the first peer state information in the first appliance with the second peer state information in the second appliance.

17. The first appliance of claim 16 wherein the processor is further configured to update the status of the data in the first peer state information with the status of the data in the second peer state information.

18. The first appliance of claim 10 wherein the processor is further configured to transmit a range of addresses of the network memory in the first peer state information and in the second peer state information over the communication network between the first appliance and the second appliance.

19. A software product for ensuring data integrity in network memory, the software product comprising:

software operational when executed by a processor to direct the processor to determining whether reconciliation between a first peer state information in a first appliance and a second peer state information in a second appliance is needed, the first peer state information and the second peer state information tracking the status of data in the network memory, determine an action to reconcile the first peer state information with the second peer state information based on a positive determination that the reconciliation is needed, and perform the action to reconcile the first peer state information with the second peer state information; and a software storage medium operational to store the software.

20. The software product of claim 19 wherein the first peer state information and the second peer state information comprise the status of the data in the network memory locally accessible to the first appliance and the status of the data in the network memory locally accessible to the second appliance.

21. The software product of claim 19 wherein the software is operational when executed by the processor to direct the processor to determine whether reconciliation is needed based on discovery of the first peer state information and discovery of the second peer state information.

22. The software product of claim 19 wherein the software is operational when executed by the processor to direct the processor to determine whether reconciliation is needed based on time.

23. The software product of claim 19 wherein the software is operational when executed by the processor to direct the processor to determine whether reconciliation is needed based on an error condition when obtaining the data from the network memory.

24. The software product of claim 23 wherein the software is operational when executed by the processor to further direct the processor to generate and transmit an error message between the first appliance and the second appliance based on the error condition.

25. The software product of claim 19 wherein the software is operational when executed by the processor to further direct the processor to exchange the first peer state information in the first appliance with the second peer state information in the second appliance.

26. The software product of claim 25 wherein the software is operational when executed by the processor to further direct the processor to update the status of the data in the first peer state information with the status of the data in the second peer state information.

27. The software product of claim 19 wherein the software is operational when executed by the processor to further direct the processor to transmit a range of addresses of the network memory in the first peer state information and in the second peer state information between the first appliance and the second appliance.

* * * * *